United States Patent
Altar et al.

(10) Patent No.: US 8,547,891 B2
(45) Date of Patent: Oct. 1, 2013

(54) SYSTEMS AND METHODS FOR IMPROVING MULTICASTING OVER A FORWARD LINK

(75) Inventors: Rashid Akbar Altar, San Diego, CA (US); Deviprasad Putchala, San Diego, CA (US); Parag Agashe, San Diego, CA (US); Vikas Jain, San Diego, CA (US); Vinod Viswanatha Menon, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 447 days.

(21) Appl. No.: 11/831,298

(22) Filed: Jul. 31, 2007

(65) Prior Publication Data

US 2008/0084878 A1  Apr. 10, 2008

Related U.S. Application Data

(60) Provisional application No. 60/850,862, filed on Oct. 10, 2006.

(51) Int. Cl.
*H04H 20/71* (2008.01)
*H04L 12/28* (2006.01)

(52) U.S. Cl.
USPC .......................................... 370/312; 370/390

(58) Field of Classification Search
None
See application file for complete search history.

(56) References Cited

U.S. PATENT DOCUMENTS

| 7,035,657 | B2 | 4/2006 | Chen et al. |
| 7,421,268 | B2* | 9/2008 | Lee et al. ...................... 455/411 |
| 7,756,069 | B2* | 7/2010 | Iino .............................. 370/313 |
| 2001/0036823 | A1 | 11/2001 | Van Lieshout et al. |
| 2002/0142757 | A1 | 10/2002 | Leung et al. |
| 2003/0186724 | A1* | 10/2003 | Tsutsumi et al. ............. 455/561 |
| 2003/0211859 | A1* | 11/2003 | Chen et al. .................... 455/518 |
| 2003/0223393 | A1 | 12/2003 | Lee |
| 2003/0228865 | A1* | 12/2003 | Terry .......................... 455/422.1 |
| 2005/0058106 | A1* | 3/2005 | Tiedemann et al. .......... 370/335 |
| 2005/0129236 | A1* | 6/2005 | Sharma ........................ 380/259 |
| 2005/0213545 | A1* | 9/2005 | Choyi et al. .................. 370/338 |
| 2006/0035659 | A1* | 2/2006 | Yoon et al. ................... 455/518 |
| 2006/0036720 | A1* | 2/2006 | Faulk ............................ 709/223 |
| 2006/0056341 | A1* | 3/2006 | Takagi et al. ................. 370/328 |
| 2006/0174032 | A1* | 8/2006 | Winchester et al. .......... 709/238 |
| 2006/0218606 | A1* | 9/2006 | Jung et al. ....................... 725/95 |

(Continued)

FOREIGN PATENT DOCUMENTS

| EP | 1077539 A1 | 2/2001 |
| JP | 2004040787 A | 2/2004 |

(Continued)

OTHER PUBLICATIONS

International Search Report—PCT/US07/080737, International Search Authority—European Patent Office—Jan. 14, 2008.

*Primary Examiner* — Eunsook Choi
(74) *Attorney, Agent, or Firm* — Kristine U Ekwueme

(57) ABSTRACT

A method for improving link efficiency in multicast transmissions is described. A data packet is sent to a multicast server. The data packet is processed. A copy of the data packet is transmitted from the multicast server to a multicast internet protocol (IP) address associated with one or more access terminals. The copy of the data packet is multicast to each of the one or more access terminals using a channel dedicated for multicast traffic that is associated with each of the one or more access terminals.

28 Claims, 15 Drawing Sheets

(56) References Cited

U.S. PATENT DOCUMENTS

| | | |
|---|---|---|
| 2007/0143600 A1* | 6/2007 | Kellil et al. ............... 713/163 |
| 2007/0201468 A1* | 8/2007 | Jokela ........................ 370/390 |
| 2009/0225693 A1* | 9/2009 | Yi et al. ..................... 370/312 |

FOREIGN PATENT DOCUMENTS

| | | | |
|---|---|---|---|
| JP | 2005512362 | A | 4/2005 |
| JP | 2005525060 | A | 8/2005 |
| JP | 2005525720 | A | 8/2005 |
| RU | 2003125333 | A | 2/2005 |
| TW | 365733 | | 8/1999 |
| TW | 402854 | | 8/2000 |
| TW | 420910 | | 2/2001 |
| WO | WO03021838 | A2 | 3/2003 |
| WO | WO03036872 | A1 | 5/2003 |
| WO | WO03051000 | A2 | 6/2003 |
| WO | 03055142 | | 7/2003 |
| WO | WO03096738 | | 11/2003 |
| WO | 2005081569 | | 9/2005 |
| WO | WO 2006/051638 | * | 5/2006 |
| WO | 2006058345 | | 6/2006 |
| WO | WO2006087034 | A1 | 8/2006 |
| WO | WO2008021838 | A2 | 2/2008 |

* cited by examiner

SYSTEMS AND METHODS FOR IMPROVING MULTICASTING OVER A FORWARD LINK

CLAIM OF PRIORITY UNDER 35 U.S.C §119

The present application for patent claims priority to provisional application No. 60/850,862, entitled "Forward Link Multicast for EV-DO," filed Oct. 10, 2006, and assigned to the assignee hereof and hereby expressly incorporated by reference herein.

TECHNICAL FIELD

The present invention relates generally to computers and computer-related technology. More specifically, the present invention relates to systems and methods for improving multicasting over a forward link.

BACKGROUND

Wireless communication networks are widely deployed to provide various types of services such as voice, packet data, broadcast, and so on. These wireless networks include Code Division Multiple Access (CDMA) networks, Global System for Mobile Communications (GSM) networks, Universal Mobile Telecommunications System (UMTS) networks, etc.

Each wireless network utilizes a particular air interface to support over-the-air communication and typically further implements a particular mobile networking protocol that supports roaming and advanced services. For example, a CDMA network utilizes a CDMA air interface and an ANSI-41 networking protocol. The CDMA network may implement one or more CDMA standards such as IS-95, IS-856 (1x-EVDO), etc. The CDMA network may provide a broadcast service that broadcasts messages to users within the network. The broadcast messages may carry various types of information such as news, traffic reports, weather information, etc.

The telecommunication standards cited above are examples of some of the various communications systems that may be implemented to transmit voice and/or data. Within these systems, multiple users share limited system resources. One such limitation is the availability of channels to support multiple users. For example, in a CDMA-type system, each user within the range of a base station is assigned one or more channels to conduct communications with the base station. If there were not enough channels, then a new user that is entering the range of the base station may be blocked from accessing the services of that base station.

In certain situations, it is desirable to transmit the same data to several users. This is particularly desirable for applications that incur a large load on the wireless network, such as video streaming. However, cellular base stations are presently configured to transmit the data on separate channels to each user, regardless of the similarity of the data to each user. In other words, the base station makes multiple transmissions with the same data content. Thus, benefits may be realized by providing systems and methods for improving multicasting over a forward link.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
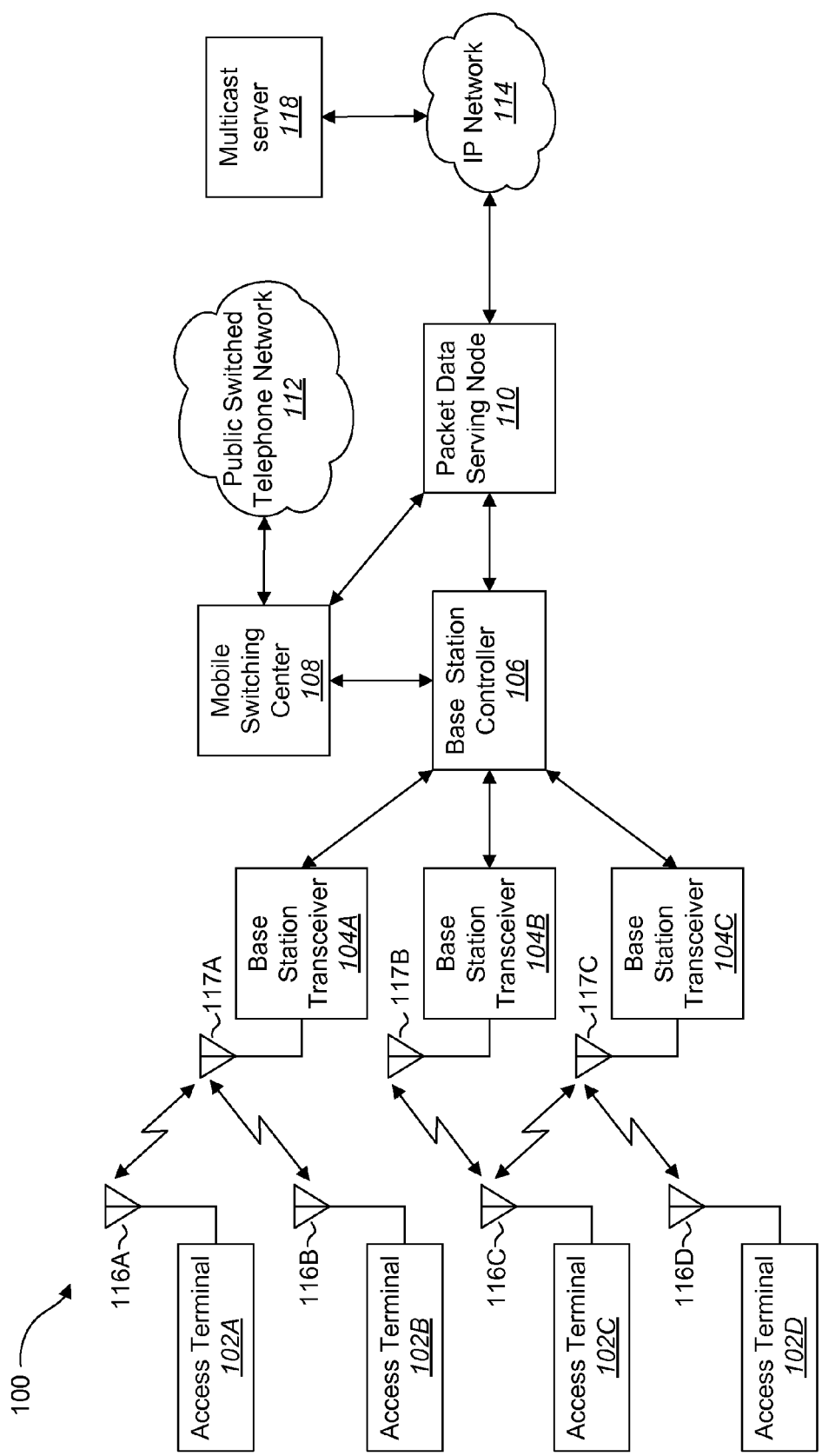
FIG. 1 is a block diagram illustrating one embodiment of a wireless communication network.

A method for improving link efficiency in multicast transmissions is described. A data packet is sent to a multicast server. The data packet is processed. A copy of the data packet is transmitted from the multicast server to a multicast internet protocol (IP) address associated with one or more access terminals. The copy of the data packet is multicast to each of the one or more access terminals using a channel dedicated for multicast traffic that is associated with each of the one or more access terminals.

In one embodiment, a base station controller forwards a single copy of the data packet to a base station transceiver for transmission to one or more access terminals using a multicast media access control (MAC) identifier. The base station controller may maintain a multicast group list. The multicast group list may indicate the one or more access terminals that belong to a particular group. In one embodiment, the particular group is a permanent multicast group that comprises a reserved identifier. The particular group may be a transient multicast group that comprises an identifier that is established upon the setup of the multicast group connection and deleted upon the termination of the multicast group connection.

A multicast MAC identifier may be dynamically allocated to one or more access terminals when the one or more access terminals enter into a certain geographical sector of a base station transceiver. In another embodiment, a multicast MAC identifier is dynamically deallocated from one or more access terminals when the one or more access terminals exit a certain geographical sector of a base station transceiver. Additional copies of the data packet may be discarded.

The multicast server may be a push to talk (PTT) server. The multicast server may be a push to talk over cellular (PoC) server.

An apparatus that is configured to improve link efficiency in multicast transmissions is also described. The apparatus includes a processor and memory in electronic communication with the processor. Instructions are stored in the memory. Communications are established with a packet data servicing node. One or more copies of a data packet are received from the packet data servicing node, wherein each copy of the data packet is associated with an access terminal. A single copy of the data packet is forwarded to a base station transceiver. Additional copies of the data packet are discarded.

A system that is configured to improve link efficiency in multicast transmissions is also described. A data packet is sent to a multicast server. The data packet is processed. A copy of the data packet is transmitted from the multicast server to a multicast internet protocol (IP) address associated with one or more access terminals. The copy of the data packet is multicast to each of the one or more access terminals using a channel dedicated for multicast traffic that is associated with each of the one or more access terminals.

A computer-readable medium configured to store a set of instructions is also described. Communications with a packet data servicing node are established. One or more copies of a data packet are received from the packet data servicing node, wherein each copy of the data packet is associated with an access terminal. A single copy of the data packet is forwarded to a base station transceiver for transmission to the one or more access terminals. Additional copies of the data packet are discarded.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

A high data rate (HDR) subscriber station, referred to herein as an Access Terminal (AT), may be mobile or stationary, and may communicate with one or more HDR base stations, referred to herein as base station transceiver (BTS). An access terminal may transmit and receive data packets through one or more base station transceivers to an HDR base station controller, referred to herein as a base station controller (BSC). Base station transceivers and base station controllers are part of a network that may be referred to as an access network (AN). An access network may transport data packets between multiple access terminals. The access network may be further connected to additional networks outside the access network, such as a corporate intranet or the Internet, and may transport data packets between each access terminal and such outside networks. An access terminal that has established an active traffic channel connection with one or more base station transceivers may be an active access terminal and may be in a traffic state. An access terminal that is in the process of establishing an active traffic channel connection with one or more base station transceivers may be in a connection setup state. An access terminal may be any data device that communicates through a wireless channel or through a wired channel, for example, using fiber optic or coaxial cables. An access terminal may further be any of a number of types of devices including, but not limited to, a personal computer (PC) card, compact flash, an external or internal modem, or a wireless or wireline phone. The communication link through which the access terminal sends signals to the base station transceiver may be a reverse link. The communication link through which a base station transceiver sends signals to an access terminal may be a forward link.

In some communication systems, packets may be used to carry data traffic. In such systems, packets carrying data traffic may be divided into sub-packets, which occupy slots of a transmission channel. For illustrative ease, the nomenclature of an Evolution-Data Optimized (EVDO) system is used herein. Such use is not intended to limit the implementation of the embodiments herein to EVDO systems.

The forward link from the base station to a remote station operating within the range of the base station may include a plurality of channels. Some of the channels of the forward link may include, but are not limited to a pilot channel, synchronization channel, paging channel, quick paging channel, broadcast channel, power control channel, assignment channel, control channel, dedicated control channel, medium access control (MAC) channel, fundamental channel, supplemental channel, supplemental code channel, and packet data channel. The reverse link from a remote station to a base station also includes a plurality of channels. Each channel carries different types of information to the target destination. Typically, voice traffic is carried on fundamental channels and data traffic is carried on supplemental channels or packet data channels. Supplemental channels are usually dedicated channels, while packet data channels usually carry signals that are designated for different parties in a time and code-multiplexed manner. Alternatively, packet data channels are also described as shared supplemental channels. For the purposes of describing the embodiments herein, the supplemental channels and the packet data channels are generically referred to as data traffic channels.

Voice traffic and data traffic are typically encoded, modulated, and spread before transmission on either the forward or reverse links. The encoding, modulation, and spreading may be implemented in a variety of formats. In an EVDO system, the transmission format depends upon the type of channel over which the voice traffic and data traffic are being transmitted and the condition of the channel, which may be described in terms of fading and interference.

Packet data systems transmit data to remote stations (i.e., from one to many stations at a time). Data transmission occurs from a base station on a shared data traffic channel, which is accompanied by control information. The control information may include parameters of the data transmission, such as modulation, coding and power. One piece of control information that is transmitted to the remote station is a medium access control identifier (MAC ID). MAC IDs are assigned to remote stations in accordance with a unique International Mobile Station Identity (IMSI) when the remote stations enter the communication system. Hence, the channel that is dedicated to the remote station may be identified by the MAC ID that is assigned to the remote station.

Some packet data systems offer services such as multicast and broadcast. In a multicast, the same transmissions are sent to a group of remote stations. In a broadcast, the same transmissions are sent to all remote stations in the range of the base station. For example, a video broadcast would require the system to transmit the video stream to all users subscribed to the video streaming channel. However, as mentioned above, packet data systems typically transmit data to one remote station at a time. Hence, multicast and broadcast in current packet data systems may utilize an independent transmission of the same data to each remote station. For example, if N remote stations were present in the system, and the system needed to broadcast the same message to all of the remote stations, then the system may transmit the same information N times, each transmission tailored to the needs of each remote station. The present systems and methods are directed towards eliminating the waste of channel resources resulting from the multiplicity of identical broadcasts to multiple recipients by improving multicasting over the forward link.

FIG. 1 is a block diagram illustrating one embodiment of a wireless communication network 100. The network 100 includes a plurality of access terminals (AT) 102A-102D (also referred to as subscriber units, user equipment, remote stations, mobile stations, etc.) The network 100 also includes a plurality of base station transceivers (BTS) 104A-104C, a base station controller (BSC) 106 (also referred to as a radio network controller or packet control function), a mobile switching center (MSC) 108, a packet data serving node (PDSN) 110 or internetworking function (IWF), a public switched telephone network (PSTN) 112 (typically a telephone company), an Internet Protocol (IP) network 114 (typically the Internet) and a multicast server 118. For purposes of simplicity, four access terminals 102A-102D, three base station transceivers 104A-104C, one base station controller 106, one mobile switching center 108, one PDSN 110 and one multicast server 118 are shown. However, there may be any number of access terminals 102, base station transceivers 104, base station controllers 106, mobile switching centers 108, PDSNs 110 and multicast servers 118.

In one embodiment, the wireless communication network 100 is a packet data services network. The access terminals 102A-102D may be any of a number of different types of wireless communication devices such as a portable phone, a cellular telephone, a cellular telephone that is connected to a laptop computer running IP-based web-browser applications, a cellular telephone with associated hands-free car kits, a personal data assistant (PDA) running IP-based web-browser applications, a wireless communication module incorporated into a portable computer or a fixed location communication module such as might be found in a wireless local loop or meter reading system. In a further embodiment, the access terminals 102A-102D may be any type of communication unit. The access terminals 102A-102D may be implemented to perform one or more wireless packet data protocols such as described in, for example, the EIA/TIA/IS-707 standard.

In one embodiment, the IP network 114 is coupled to the PDSN 110 and the multicast server 118. The PDSN 110 may be coupled to the MSC 108, and the MSC 108 may be coupled to the BSC 106 and the PSTN 112. The BSC 106 may be coupled to the base station transceivers 104A-104C via wireless utilized for transmission of voice and/or data packets in accordance with protocols including, e.g., E1, T1, Asynchronous Transfer Mode (ATM), IP, PPP, Frame Relay, HDSL, ADSL or xDSL. In an alternative embodiment, the BSC 106 is coupled directly to the PDSN 110 and the MSC 108 is not coupled to the PDSN 110.

During operation of the wireless communication network 100, the base station transceivers 104A-104C receive and demodulate sets of reverse signals from various access terminals 102A-102D engaged in telephone calls, web browsing or other data communications. Each reverse signal received by a given base station transceiver 104A-104C may be processed within that base station transceiver 104A-104C. Each base station transceiver 104A-104C may communicate with a plurality of access terminals 102A-102D by modulating and transmitting sets of forward signals to the access terminals 102A-102D. For example, as shown in FIG. 1, base station transceiver 104A communicates with first and second access terminals 102A, 102B simultaneously, and the base station transceiver 104C communicates with third and fourth access terminals 102C, 102D simultaneously.

The base station controller 106 may provide call resource allocation and mobility management functionality including the orchestration of soft handoffs of a call for a particular access terminal 102A-102D from one base station transceiver 104A-104C to another base station transceiver 104A-104C. For example, an access terminal 102C may be communicating with base station transceivers 104B, 104C simultaneously. Eventually, when the access terminal 102C moves far enough away from one 104C of the base station transceivers, the call may be handed off to the other base station transceiver 104B.

If the transmission is a telephone call, the base station controller 106 may route the received data to the MSC 108. The MSC 108 may provide additional routing services for interfacing with the PSTN 112. If the transmission is a packet-based transmission, such as a data call destined for the IP network 114, the MSC 108 may route the data packets to the PDSN 110, which may transmit the packets to the IP network 114. The packets may be transmitted over the IP network 114 to the multicast server 118. In addition, the multicast server 118 may transmit packets to the PDSN 110 over the IP network 114. In one embodiment, the BSC 106 routes the packets directly to the PDSN 110, which sends the packets to the IP network 114.

Figure 2:
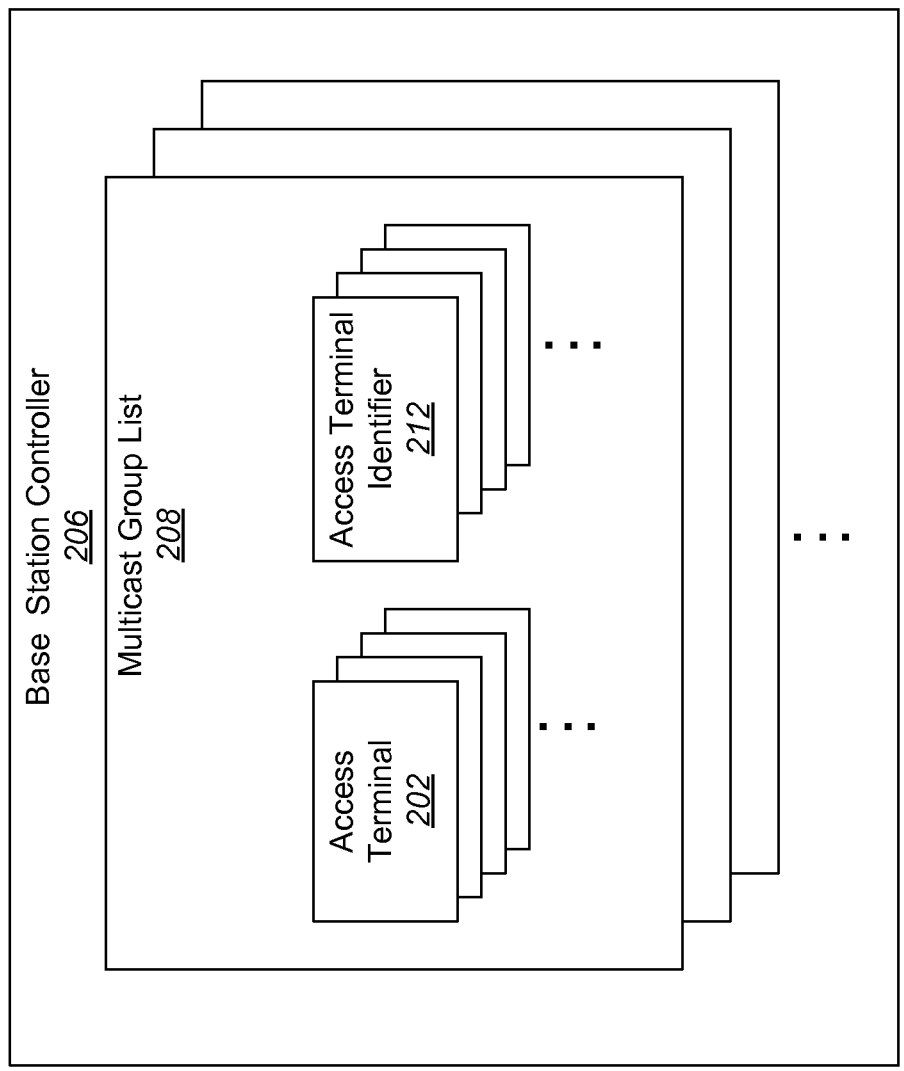
FIG. 2 is block diagram illustrating one embodiment of a base station controller.

FIG. 2 is block diagram illustrating one embodiment of a base station controller 206. The BSC 206 may maintain a multicast group list 208 which indicates which access terminal(s) belong to a particular group. As illustrated, the BSC 206 may maintain more than one multicast group list 208. In one embodiment, an access terminal 202 may become a member of a particular multicast group when the access terminal 202 enters a certain geographic area and possesses the appropriate identifications. For example, an access terminal identifier 212 associated with the access terminal 202 may be analyzed when the access terminal 202 enters the geographic area of a certain multicast group. The access terminal identifier 212 may include a multicast IP address associated with the multicast group, a phone number associated with the access terminal 202, a MAC address associated with the access terminal 202, a serial number associated with the access terminal 202, etc. If the access terminal 202 possesses the appropriate identifier 212, the access terminal 202 is added to the multicast group list 208.

Figure 3:
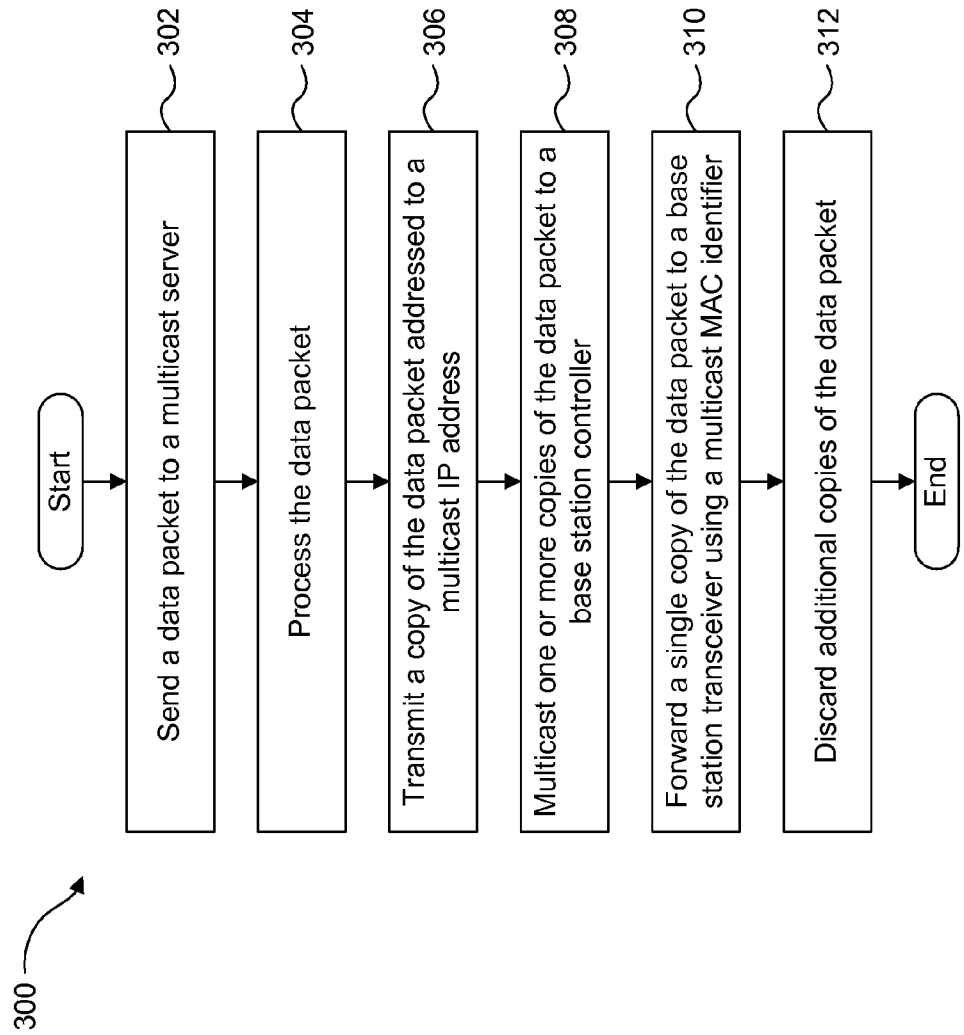
FIG. 3 is a flow diagram illustrating one embodiment of a method for improving the efficiency of multicasting over a forward link.

FIG. 3 is a flow diagram illustrating one embodiment of a method 300 for improving the efficiency of multicasting over a forward link. The method 300 may be implemented within a wireless communications network, such as the network 100 illustrated in FIG. 1. In one embodiment, a data packet is sent 302 to a multicast server 118. The data packet may include data and control information regarding such data as previously explained. The data packet may be sent 302 from an access terminal 102A.

The multicast server may process 304 the data packet and transmit 306 a copy of the data packet. The copy of the data packet may be addressed to a multicast IP address. As such, the data packet may be transmitted 306 to the multicast IP address. In one embodiment, the multicast IP address may be associated with a group of interested receivers, for example access terminals 102B-102D. The data packet may be sent to the multicast IP address, and a router (i.e., the PDSN 110) may make one or more copies of the data packet. The one or more copies of the data packet may be multicast 308 to a base station controller 106.

In one embodiment, the base station controller 106 may forward 310 a single copy of the data packet to a base station transceiver 104A. The base station controller 106 may forward 310 the single copy using a multicast MAC identifier. The multicast MAC identifier may be assigned to a plurality of users (i.e., access terminals 102) within a sector corresponding to the base station transceiver 104. An individual access terminal 102 may be allocated the multicast MAC identifier dynamically when the access terminal comes into the sector associated with the base station transceiver 104. The multicast MAC identifier may also be dynamically deallocated when the access terminal 102 leaves the sector associated with the base station transceiver 104. In one embodiment, additional copies of the data packet are discarded 312 so that only a single copy of the data packet is forwarded 310 to a base station transceiver 104.

The system may support different kinds of multicast groups. The multicast group may be transient or permanent. The permanent multicast group is administratively provisioned in the network (access network, PDSN and the multicast server) with well-known identifiers such as a multicast group identification, multicast IP address and multicast port. The BSC may be provisioned with an association from the multicast group identification to a Radio Link Protocol (RLP) flow number. Public service groups such as police and firefighters are examples of permanent multicast groups. The permanent multicast groups always exist in the system even though there may not be any users or access terminals in the multicast group connection. The identifiers for the permanent multicast groups are reserved and are not available for use by the transient multicast groups. The transient multicast groups are formed on an ad-hoc basis, such as push-to-talk (PTT) session between a subset of access terminals at any given point of time. The transient multicast groups exist as long as there are access terminals active in a multicast group connection. The transient multicast group identifiers are established only upon the setup of the multicast group connection and are deleted upon the connection termination.

In order to receive data packets for a multicast group, the access terminals may establish a dedicated data path up to the PDSN. This involves establishing a dedicated auxiliary A10 channel between the PDSN and the BSC and a dedicated RLP flow between the BSC and the access terminal. In one embodiment, the dedicated data path establishment and the subsequent multicast group connection setup procedure may be optimized for supporting only one transient multicast group connection for a user or access terminal at any given time. In another embodiment, the dedicated data path establishment and subsequent multicast group connection setup procedures may support multiple transient multicast group connections for a user or access terminal at any given time. In either of these embodiments, the user or the access terminal may also support multiple permanent multicast group connections at the same time.

Figure 4:
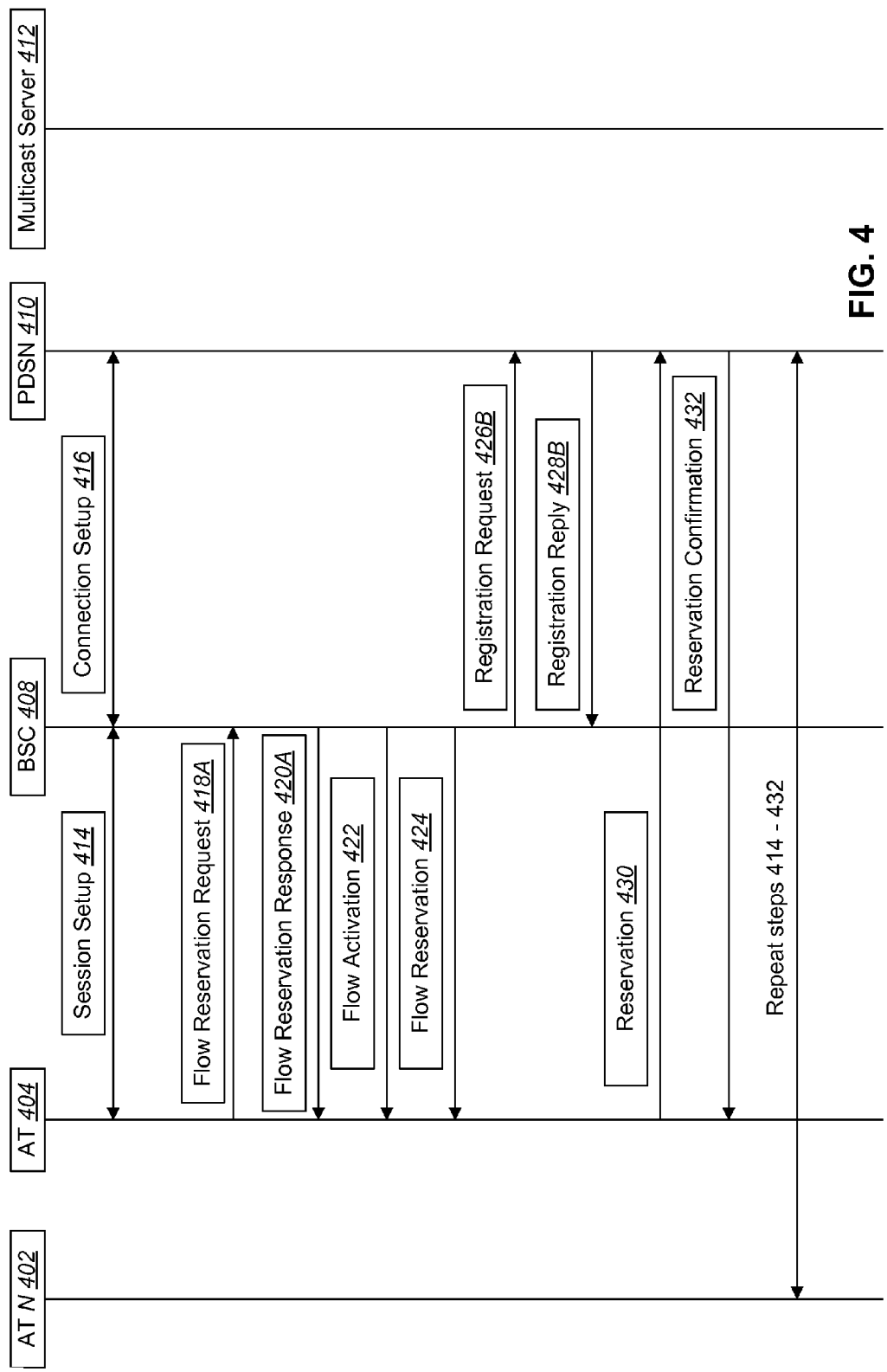
FIG. 4 is a thread diagram illustrating one embodiment of a data path being established for supporting only one transient multicast group connection for an access terminal.

FIG. 4 is a thread diagram illustrating one embodiment of a dedicated data path being established by an access terminal 404 for supporting only one transient multicast group connection at any given time. The data packets may be transmitted by a PDSN 410 over this established data path connection. An access terminal 404 may first establish a session 414 with a base station controller. The base station controller 408 may establish an A11 connection 416 with the PDSN 410.

In one embodiment, a multicast server 412 is a PTT server. In another embodiment, the multicast server 412 is a push to talk over cellular (PoC). Each access terminal within a network, such as a single access terminal 404 and a plurality of access terminals 402, may establish a RLP flow and an auxiliary A10 channel. As previously mentioned, the auxiliary A10 channel may be dedicated for certain data traffic. The RLP flow may be bound to the auxiliary A10 channel at a base station controller 408. This data path may be established a priori before a multicast group connection with the multicast server 412 is established.

The single access terminal 404 may send a flow reservation request 418A to the base station controller 408. The flow reservation request 418A may include identification for the IP flow and quality of service (QoS) parameters for which the RLP flow reservation is requested. The flow reservation request 418A may also include an indication that the flow reservation is for a transient multicast group IP flow. The base station controller 408 may respond by transmitting a flow reservation response 420A that may include the QoS parameters granted for the IP flow. The base station controller 408 may send flow activation 422 to activate the RLP flow. The base station controller 408 may send the flow reservation 424 to assign the activated RLP flow for the IP flow indicated in flow reservation request 418A.

In one embodiment, the base station controller 408 transmits an A11 registration request 426B to the PDSN 410. The A11 registration request 426B may include the IP flow identification and the granted quality of service (QoS) parameters of the IP flow for which the auxiliary A10 channel is to be established. The PDSN 410 may respond by transmitting a registration reply 428B indicating the successful establishment of the auxiliary A10 channel.

The access terminal 404 may also transmit a reservation 430 to the PDSN 410. The reservation 430 may include a packet filter and IP flow identification. The PDSN 410 may transmit a reservation confirmation 432. In one embodiment, the packet filter may be set up at the PDSN 410 such that the data traffic for the transient multicast group is filtered into the dedicated auxiliary A10 channel established previously. The access terminal 404 may indicate a multicast group ID via the air-interface messaging to the base station controller 408. The multicast group ID may be derived from an application running on the access terminal 404 which signals messages exchanged between applications on various access terminals during the setup of the multicast group connection. The steps 414-432 described in FIG. 4 may be repeated for each access terminal 402 included in a network.

Figure 5:
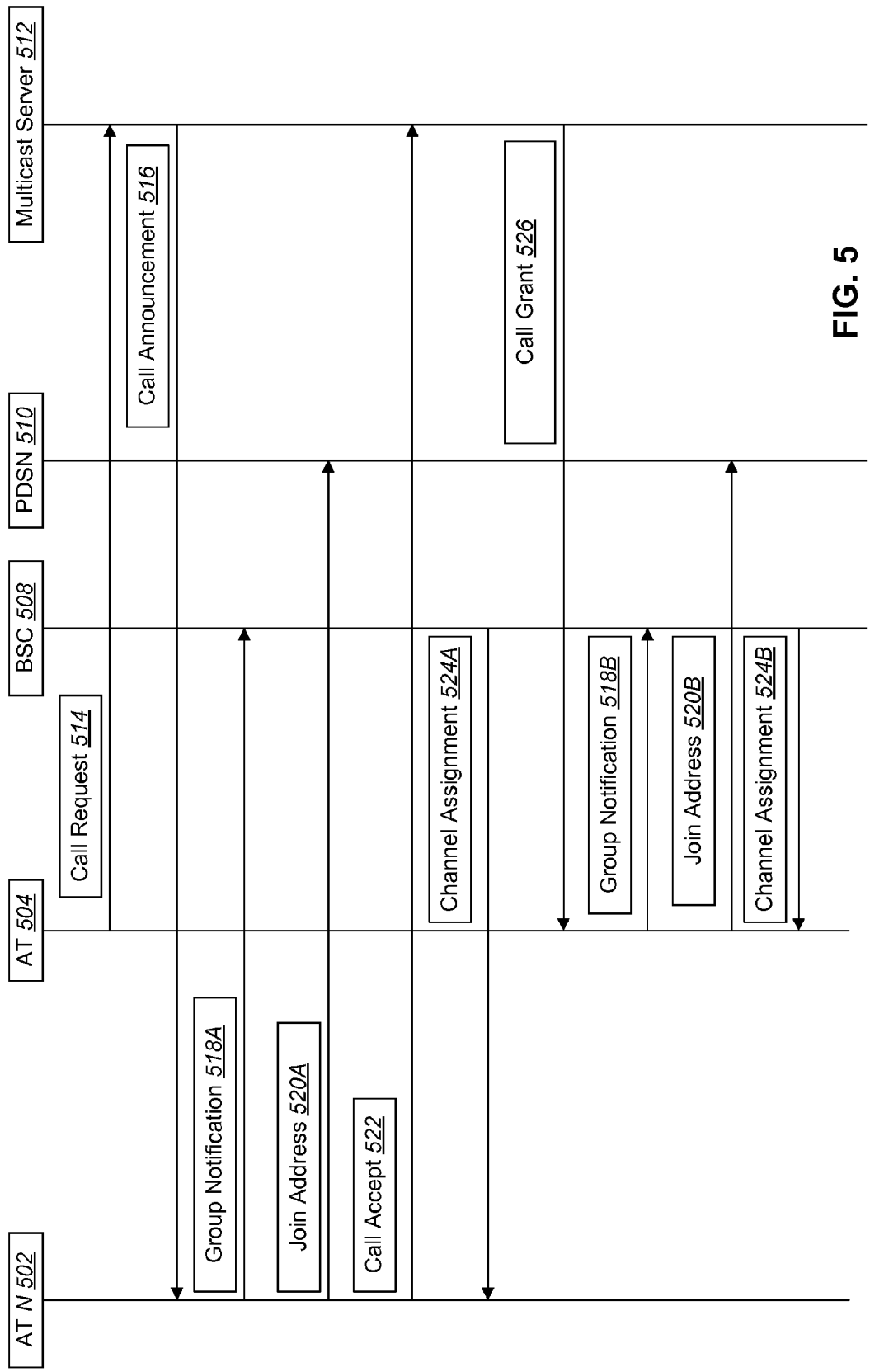
FIG. 5 is a thread diagram illustrating one embodiment of a transient multicast connection being established between one or more access terminals and a multicast server utilizing a multicast IP address.

FIG. 5 is a thread diagram illustrating one embodiment of a transient multicast group connection being established between one or more access terminals 502, 504 and a multicast server 512 utilizing a multicast IP address. This diagram illustrates the multicast group connection setup procedure when an access terminal is able to support one transient multicast group connection at any given time. A first access terminal 504 may multicast information to a second, third, etc., up to an Nth access terminal 502 (AT N). In one embodiment, the access terminal 504 sends a call request 514 to the multicast server 512. The multicast server may send a call announcement 516 to one or more access terminals, represented by AT N 502. The call announcement 516 may include parameters such as a call identification, multicast IP address and multicast port. The multicast server 512 may use the multicast IP address and port indicated in 516 to transmit data to each access terminal 502, 504 in the group.

The access terminals within the plurality of access terminals 502 may use the parameters included in the call announcement 516 to send a group notification 518A to a base station controller 508. The group notification 518A may include the multicast group IP address for identifying the multicast group. Each access terminal 502 may send a join address 520A notification to a packet data servicing node (PDSN) 510. The PDSN 510 may implement the multicast agent functions required for IP multicasting. In other words, each access terminal 502 in the group joins a multicast IP address group rooted at the PDSN 510. The joining of the access terminals 502 to the multicast IP address group may be implemented using Internet Group Management Protocol (IGMP).

The access terminals 502 may send a call accept 522 notification to the multicast server 512 after joining the multicast IP address group. The base station controller 508 sends a channel assignment 524A to each access terminal 502. The channel assignment 524A indicates the channel on which communication may be implemented between each access terminal 502 and the base station transceiver. The channel assignment 524A may include a multicast MAC ID that is assigned for transmitting multicast data.

The multicast server 512 may send a call grant 526 to the access terminal 504 that originated the multicast group connection. The call grant 526 indicates a successful setup of multicast group connection and may include parameters such as the call identification, multicast IP address and multicast port. The access terminal 504 may send a group notification 518B to the base station controller 508 indicating the multicast IP address assigned for the multicast group. The access terminal 504 may also send a join address 520B notification to the PDSN 510. In other words, the access terminal 504 may join the multicast IP address group rooted at the PDSN. The access terminal 504 may join the group via the IGMP protocol. The base station controller 508 may send a channel assignment 524B to the access terminal 504. The channel assignment 524B may include a multicast MAC ID that is assigned for transmitting multicast data.

The base station controller 508 may become aware of each access terminal that belongs to the same multicast group via the multicast group notified by the access terminal in group notification 518A to the base station controller. In one embodiment, the base station controller 508 elects one of the RLP flows that have been established for the multicast group to serve as the "leader" RLP flow. As explained earlier, the base station controller 508 receives packets from the PDSN 510 over the dedicated auxiliary A10 channel for each of the access terminals in the multicast group connection and forwards the packet to the RLP flow assigned to it. The "leader" RLP flow may forward the packet to the base station transceiver for over the air transmission using the multicast MAC ID. The non-leader RLP flows discard and drop their respective packets. If the access terminal with the "leader" RLP flow leaves the multicast group connection or geographically moves away from the service area of the serving base station controller 508, another access terminal's RLP flow may be selected as the new "leader" RLP flow.

In one embodiment, the access terminal 504 or one of the access terminals within the plurality of access terminals 502 may terminate the connection with the multicast server 512. When connection with the multicast server 512 is terminated, the access terminal 502, 504 may leave the multicast IP address group via the IGMP protocol.

Figure 6:
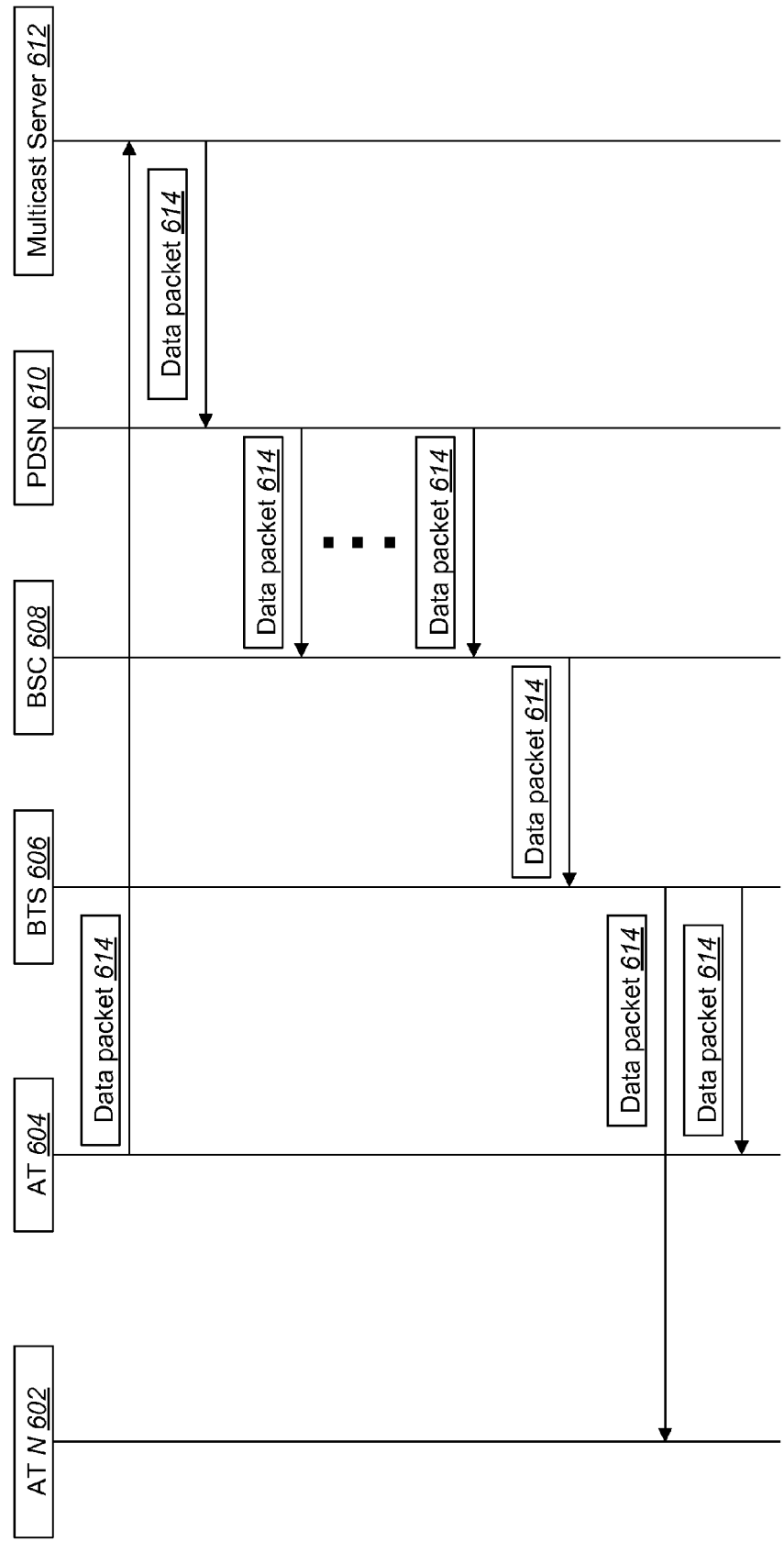
FIG. 6 is a thread diagram illustrating one embodiment of a data flow using a multicast IP address for a transient or permanent multicast group connection.

FIG. 6 is a thread diagram illustrating one embodiment of a data flow using a multicast IP address. The illustrated data flow may support a single transient multicast group connection per access terminal, multiple permanent multicast group connections per access terminal and multiple transient multicast group connections per access terminal.

In one embodiment, a single access terminal 604 may send a data packet 614 to a multicast server 612. In one embodiment, the single access terminal 604 that sends the data packet 614 maintains the connection with the multicast server 612. The data packet 614 may be an IP packet which includes an IP address for the multicast server 612 as the destination IP address. The multicast server 612 may receive and process the data packet 614. The server 612 may then transmit the data packet to a PDSN 610. When the data packet 614 is transmitted from the multicast server 612, the destination of the packet 614 may include a multicast IP address that is associated with a group of access terminals.

In one embodiment, the PDSN 610 multicasts the received data packet 614. Each of the access terminals within a plurality of access terminals 602 may be associated with an auxiliary A10 channel that is dedicated for multicast group connection traffic with the PDSN 610. In one embodiment, the multicast server 612 is a push to talk (PTT) server and the auxiliary A10 channel is dedicated for PTT traffic. The PDSN 610 may multicast a copy of the data packet 614 onto each auxiliary A10 channel. The PDSN 610 may be a multicast router. In one embodiment, one or more intervening routers may be located between the multicast server 612 and the PDSN 610. The intervening routers may also be capable of multicasting in order to multicast the data packet 614 to the PDSN 610. However, the multicast server 612 and the PDSN 610 may be provisioned on the same subnet, in which case there may not be any intervening routers.

In one embodiment, the base station controller 608 receives the copies of the data packet 614 sent from the PDSN 610. The base station controller 608 may forward one copy of the data packet 614 to a base station transceiver 606. The base station controller 608 may also discard the additional copies of the data packet 614 that were received from the PDSN 610. In one embodiment, the base station transceiver 606 utilizes over the air transmission and transmits the single copy of the data packet 614 to each access terminal within the plurality of access terminals 602. The base station transceiver 606 may use a multicast MAC ID that is collectively assigned to the plurality of access terminals 602 to transmit the single copy of the data packet 614. In one embodiment, each access terminal within the plurality of access terminals 602 may process the received data packet 614 as the packet 614 is addressed to the same multicast IP address that each of the access terminals within the plurality 602 have subscribed to. The access terminal 604 may also receive data packet 614 and discard it because access terminal 604 originated the data packet 614. In one embodiment, the access terminal 604 may discard the data packet 614 based on the source IP address which may indicate access terminal's 604 unicast IP address. In another embodiment, the multicast group connection may be a PTT call and is half duplex. In this case, the access terminal 604 may discard any received data packet since it is also transmitting the data packet. The multicast server 612 transmits one packet 614 (destined for the multicast IP address) instead of multiple copies that are each addressed to a unicast IP address associated with each access terminal.

Figure 7:
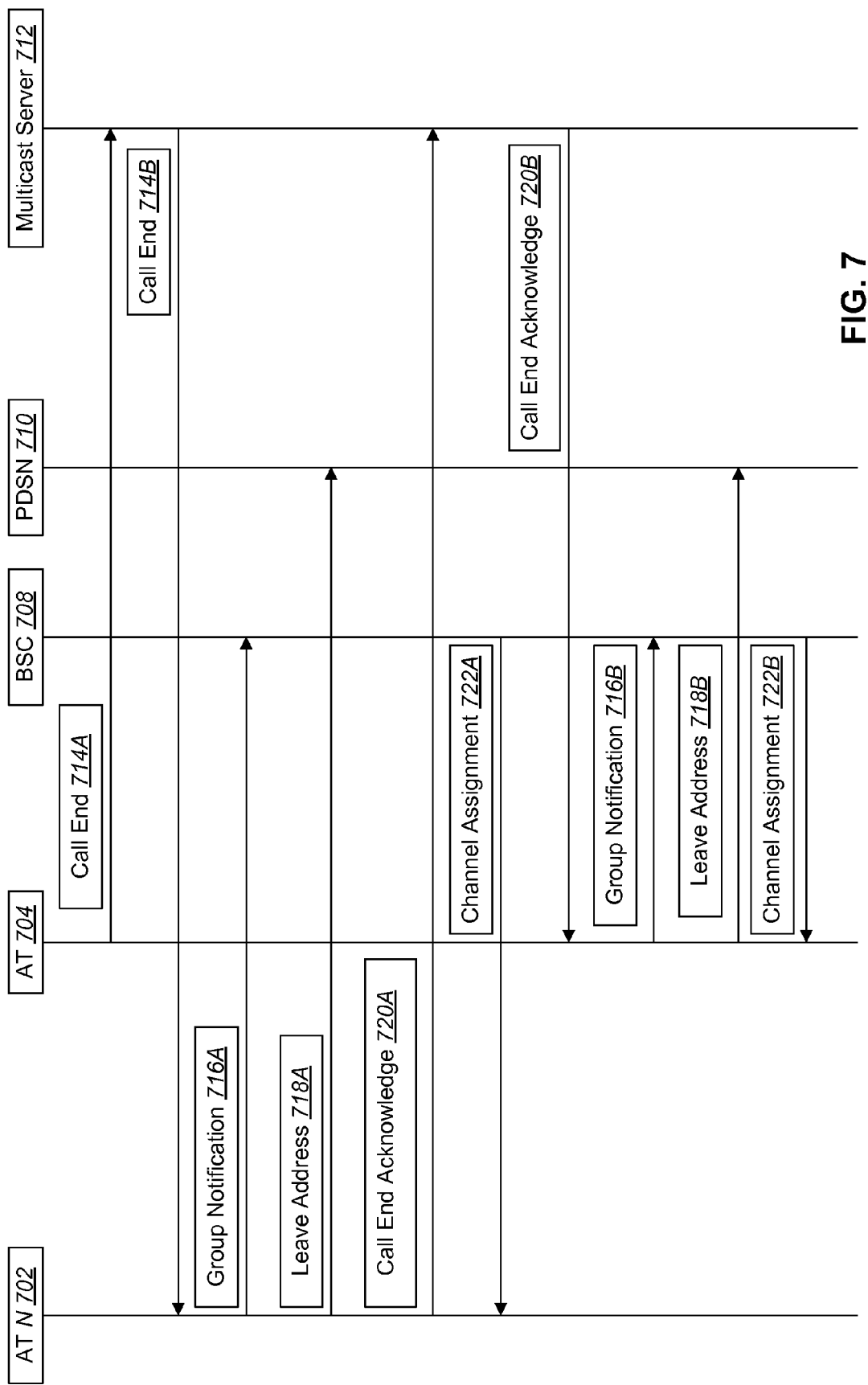
FIG. 7 is a thread diagram illustrating one embodiment of a transient multicast group connection being terminated between a multicast server and one or more access terminals.

FIG. 7 is a thread diagram illustrating one embodiment of a transient multicast group connection being terminated between a multicast server 712 and one or more access terminals 702, 704. The thread diagram illustrated in FIG. 7 may illustrate the case when the access terminals 702, 704 can support only one transient multicast group connection at any given time. A single access terminal 704 may send a call end 714A notification to the multicast server 712. The multicast server 712 may send a call end 714B notification to a plurality of access terminals 702. The plurality of access terminals 702 may transmit a group notification 716A to a base station controller 708. The group notification 716A may include the multicast group IP address and indicate that the access terminal is leaving the multicast group connection. The plurality of access terminals 702 may also send a leave address 718A notification to the PDSN 710. In one embodiment, the leave address 718A notification indicates that the plurality of access terminals 702 are leaving the multicast IP address group. As such, the plurality of access terminals 702 are no longer associated with the multicast IP address. The leave address 718A notification may be sent utilizing the IGMP protocol.

The plurality of access terminals 702 may also transmit a call end acknowledge 720A message to the multicast server 712. The base station controller 708 may send a channel assignment 722A to the plurality of access terminals 702. The channel assignment 722A may indicate that the multicast MAC ID is not associated with the plurality of access terminals 702.

In one embodiment, the multicast server 712 sends a call end acknowledge 720B to the single access terminal 704. The single access terminal 704 may transmit a group notification 716B to the base station controller 708. The group notification 716B may indicate that the access terminal is leaving the multicast group connection. The single access terminal 704 may further send a leave address 718B notification to the PDSN 710. The leave address notification 716B may indicate that the single access terminal 704 is no longer associated with the multicast IP address group. As such, the single access terminal 704 is no longer associated with a multicast IP address. The base station controller 708 may also send a channel assignment 722B to the single access terminal 704. The channel assignment 722B may indicate that the multicast MAC ID is not associated with the access terminal 704.

Figure 8:
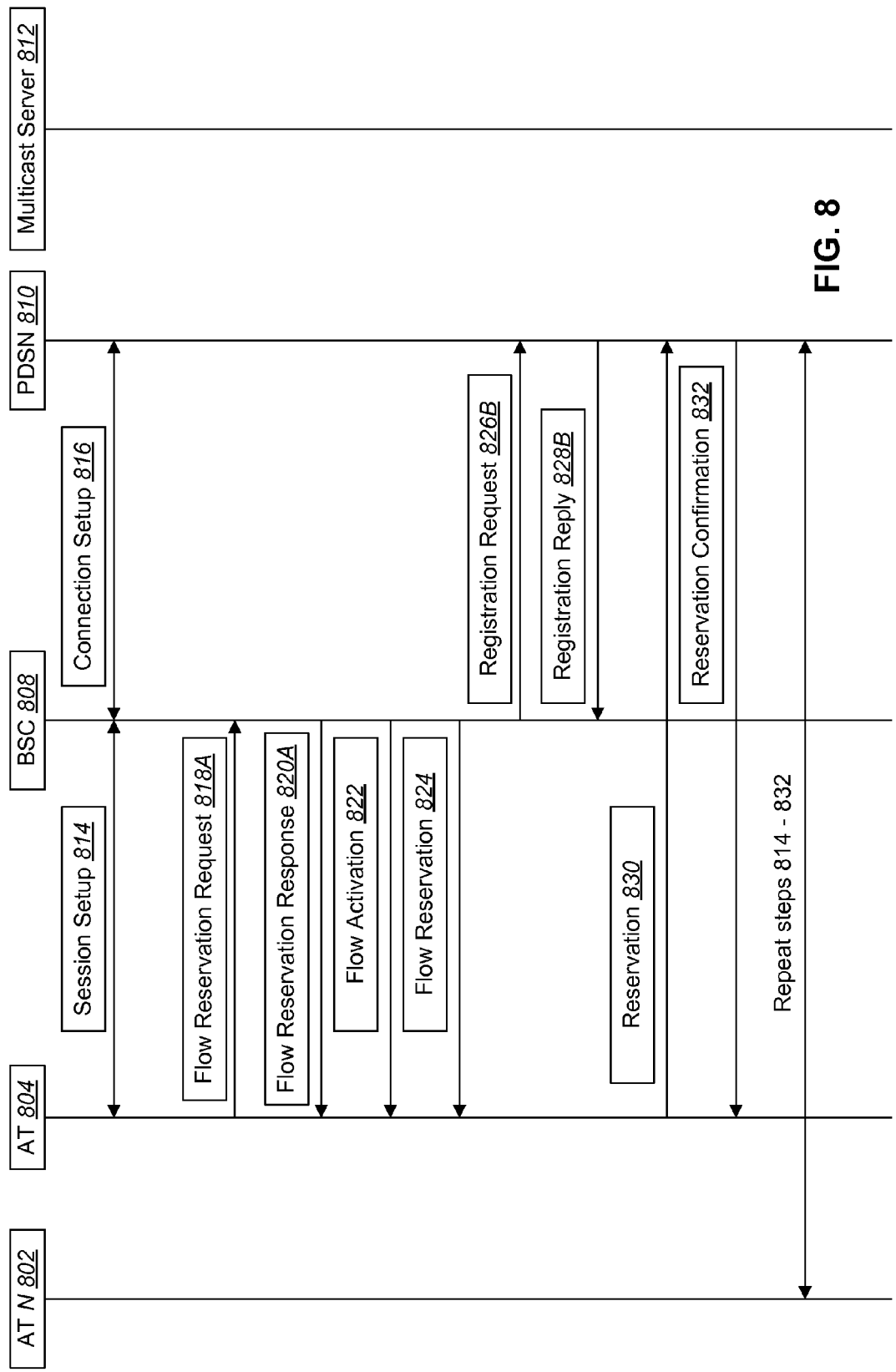
FIG. 8 is a thread diagram illustrating one embodiment of a data path being established for supporting multiple permanent multicast group connections for an access terminal.

FIG. 8 is a thread diagram illustrating one embodiment of a dedicated data path being established by an access terminal 804, for supporting multiple permanent group connections for an access terminal. The data packets may be transmitted by the PDSN 810 over this established data path connection. An access terminal 804 may first establish a session 814 with a base station controller. The base station controller 808 may establish an A11 connection 816 with a PDSN 810.

In one embodiment, the multicast server 812 is a PTT server. In another embodiment, the multicast server 812 is a PoC. Each access terminal within a network, such as a single access terminal 804 and a plurality of access terminals 802, may establish a RLP flow and an auxiliary A10 channel. As previously mentioned, the auxiliary A10 channel may be dedicated for certain data traffic. The RLP flow may be bound to the auxiliary A10 channel at a base station controller 808. This data path may be established a priori before a permanent multicast group connection with the multicast server 812 is established.

The single access terminal 804 may send a flow reservation request 818A to the base station controller 808. The flow reservation request 818A may include identification for the IP flow and QoS parameters for which the RLP flow reservation is requested. The flow reservation request 818A may also include an indication that the flow reservation is for a specific permanent multicast group, for example, police. The base station controller 808 may respond by transmitting a flow reservation response 820A that may include the QoS parameters granted for the IP flow. The base station controller 808 may activate 822 the RLP flow that is provisioned for the specific permanent multicast group indicated in flow reservation request 818A. The base station controller 808 may send flow reservation 824 to assign the activated RLP flow for the IP flow indicated in flow reservation request 818A.

In one embodiment, the base station controller 808 transmits an A11 registration request 826B to the PDSN 810. The A11 registration request 826B may include the IP flow identification and the granted QoS parameters of the IP flow for which the auxiliary A10 channel is to be established. The PDSN 810 may respond by transmitting a registration reply 828B indicating the successful establishment of the auxiliary A10 channel.

The access terminal 804 may also transmit a reservation 830 to the PDSN 810. The reservation 830 may include a packet filter and IP flow identification. The PDSN 810 may transmit a reservation confirmation 832. In one embodiment, the packet filter may be set up at the PDSN 810 such that the data traffic for the permanent multicast group is filtered into the dedicated auxiliary A10 channel established previously. The access terminal 804 may indicate a multicast group ID via the air-interface messaging to the base station controller 808. The multicast group ID may be derived from an application running on the access terminal 804 which signals messages exchanged between applications on various access terminals during the setup of the multicast group connection. The steps 814-832 described in FIG. 8 may be repeated for each access terminal 802 included in a network.

Figure 9:
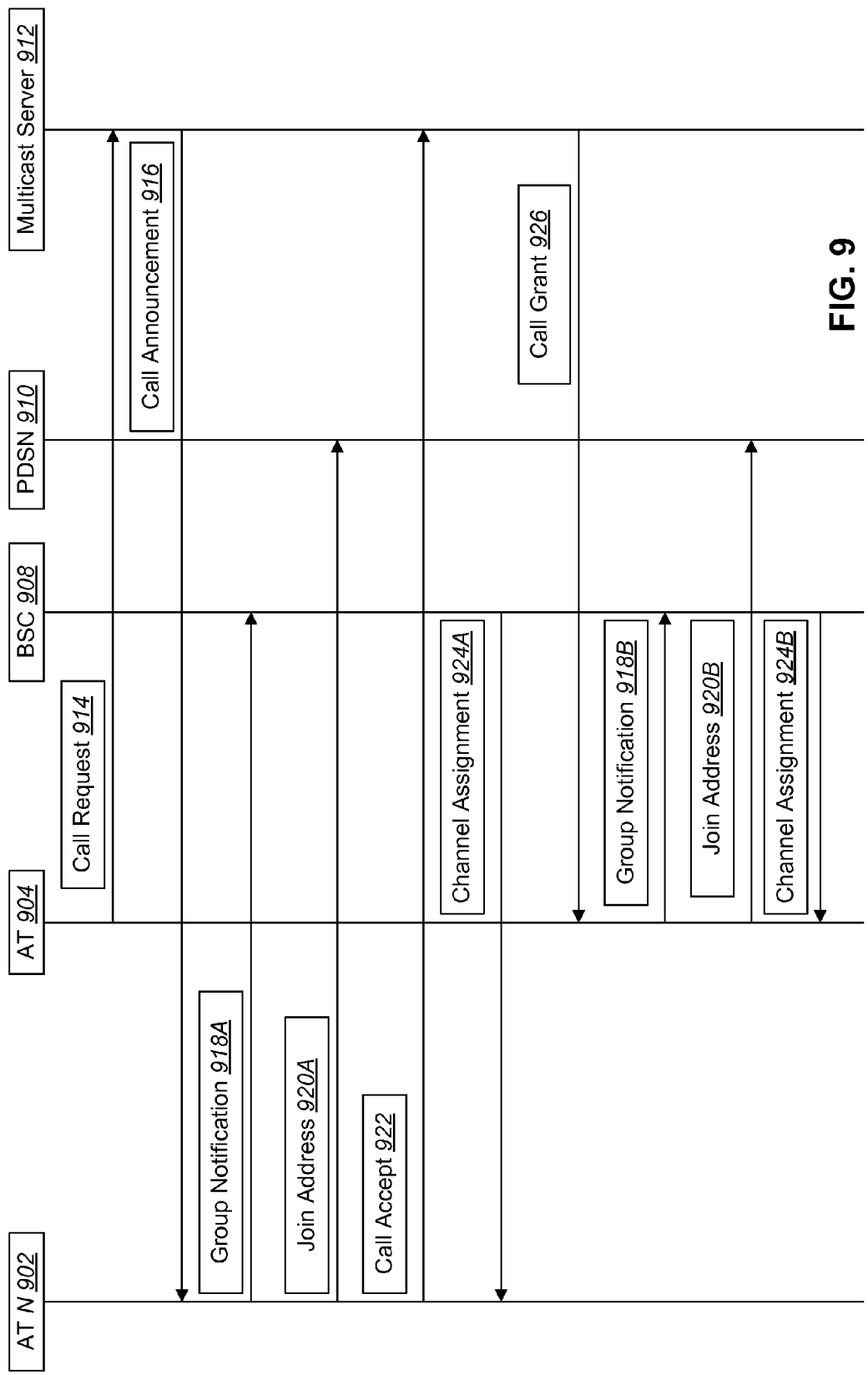
FIG. 9 is a thread diagram illustrating one embodiment of a permanent multicast group connection being established between one or more access terminals and a multicast server utilizing a multicast IP address.

FIG. 9 is a thread diagram illustrating one embodiment of a permanent multicast group connection being established between one or more access terminals 902, 904 and a multicast server 912. A first access terminal 904 may multicast information to a second, third, etc. up to an N$^{th}$ access terminal 902 (AT N). In one embodiment, the access terminal 904 sends a call request 914 to the multicast server 912. The multicast server may send a call announcement 916 to one or more access terminals, represented by AT N 902. The call announcement 916 may include parameters such as a call identification, multicast IP address and multicast port. The multicast server 912 may use the multicast IP address and port indicated in 916 to transmit data to each access terminal 902, 904 in the group.

The access terminals within the plurality of access terminals 902 may use the parameters included in the call announcement 916 to send a group notification 918A to a base station controller 908. The group notification 918A may include the multicast IP address for identifying the multicast group. Each access terminal 902 may send a join address 920A notification to a PDSN 910. The PDSN 910 may implement the multicast agent functions required for IP multicasting. In other words, each access terminal 902 in the group joins a multicast IP address group rooted at the PDSN 910. The joining of the access terminals 902 to the multicast IP address group may be implemented using IGMP.

Each access terminal 902, after joining the multicast IP address group, sends a call accept 922 notification to the multicast server 912. The base station controller 908 sends a channel assignment 924A to each access terminal 902. The channel assignment 924A indicates the channel on which communication may be implemented between each access terminal 902 and the base station transceiver. The channel assignment 924A may include a multicast MAC ID that is assigned for transmitting multicast data.

The multicast server 912 may send a call grant 926 to the access terminal 904 that originated the multicast group connection. The call grant 926 indicates a successful setup of multicast group connection and may include parameters such as the call identification, multicast IP address and multicast port. The access terminal 904 may send a group notification 918B to the base station controller 908 indicating the multicast IP address assigned for the multicast group. The access terminal 904 may also send a join address 920B notification to the PDSN 910. In other words, the access terminal 904 may join the multicast IP address group rooted at the PDSN 910. The access terminal 904 may join the multicast IP address group via the IGMP protocol. The base station controller 908 may send a channel assignment 924B to the access terminal 904. The channel assignment 924B may include a multicast MAC ID that is assigned for transmitting multicast data.

The base station controller may become aware of each access terminal that belongs to the same group via the multicast group ID reported by each access terminal to the base station controller in an air-interface message. In one embodiment, the base station controller 808 elects one of the RLP flows that have been established to serve as the "leader" RLP flow. As explained earlier, the base station controller 808 receives packets from the PDSN 810 over the dedicated auxiliary A10 channel for each of the access terminals in the multicast group connection and forwards the packet to the RLP flow assigned to it. The "leader" RLP flow may forward the packet to the base station transceiver over the air transmission using the multicast MAC ID. The non-leader RLP flows discard and drop their respective packets.

In one embodiment, the access terminal 904 or one of the access terminals within the plurality of access terminals 902 may terminate the connection with the multicast server 912. When connection with the multicast server 912 is terminated, the access terminal 902, 904 may leave the multicast IP address group via the IGMP protocol.

Figure 10:
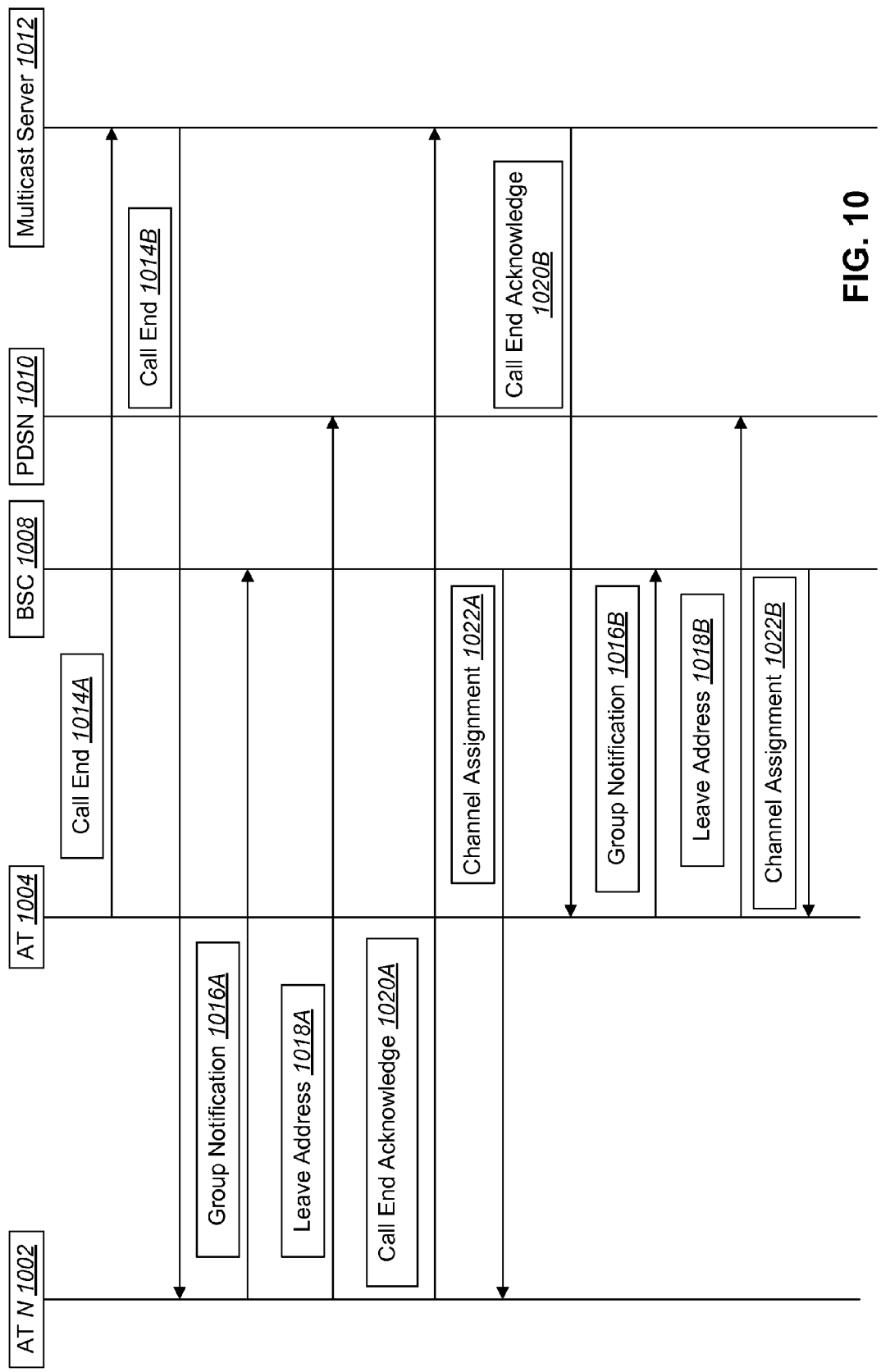
FIG. 10 is a thread diagram illustrating one embodiment of a permanent multicast group connection being terminated between a multicast server and one or more access terminals.

FIG. 10 is a thread diagram illustrating one embodiment of a permanent multicast group connection being terminated between a multicast server 1012 and one or more access terminals 1002, 1004. The thread diagram illustrated in FIG. 10 may illustrate the case when the access terminals 1002, 1004 may support multiple permanent multicast group connections at the same time. A single access terminal 1004 may send a call end 1014A notification to the multicast server 1012. The multicast server 1012 may send a call end 1014B notification to a plurality of access terminals 1002. The plurality of access terminals 1002 may transmit a group notification 1016A to a base station controller 1008. The group notification 1016A may include the multicast group IP address and indicate that the access terminal is leaving the multicast group connection. The plurality of access terminals 1002 may also send a leave address 1018A notification to the PDSN 1010. In one embodiment, the leave address 1018A notification indicates that the access terminals 1002 are leaving the multicast IP address group. The plurality of access terminals 1002 is no longer associated with the multicast IP address. The leave address 1018A notification may be sent using the IGMP protocol.

The plurality of access terminals 1002 may also transmit a call end acknowledge 1020A message to the multicast server 1012. The base station controller 1008 may send a channel assignment 1022A to the plurality of access terminals 1002. The channel assignment 1022A may indicate that the multicast MAC ID is not associated with the plurality of access terminals 1002.

In one embodiment, the multicast server 1012 sends a call end acknowledge 1020B to the single access terminal 1004. The single access terminal 1004 may transmit a group notification 1016B to the base station controller 1008. The group notification 1016B may include the multicast group IP address and indicate that the access terminal is leaving the multicast group connection. The single access terminal 1004 may further send a leave address 1018B notification to the PDSN 1010. The leave address notification 1018B may indicate that the single access terminal 1004 is no longer associated with the multicast IP address. The base station controller 1008 may also send a channel assignment 1022B to the single access terminal 1004. The channel assignment 1022B may indicate that the multicast MAC ID is not associated with the access terminal 1004.

Figure 11:
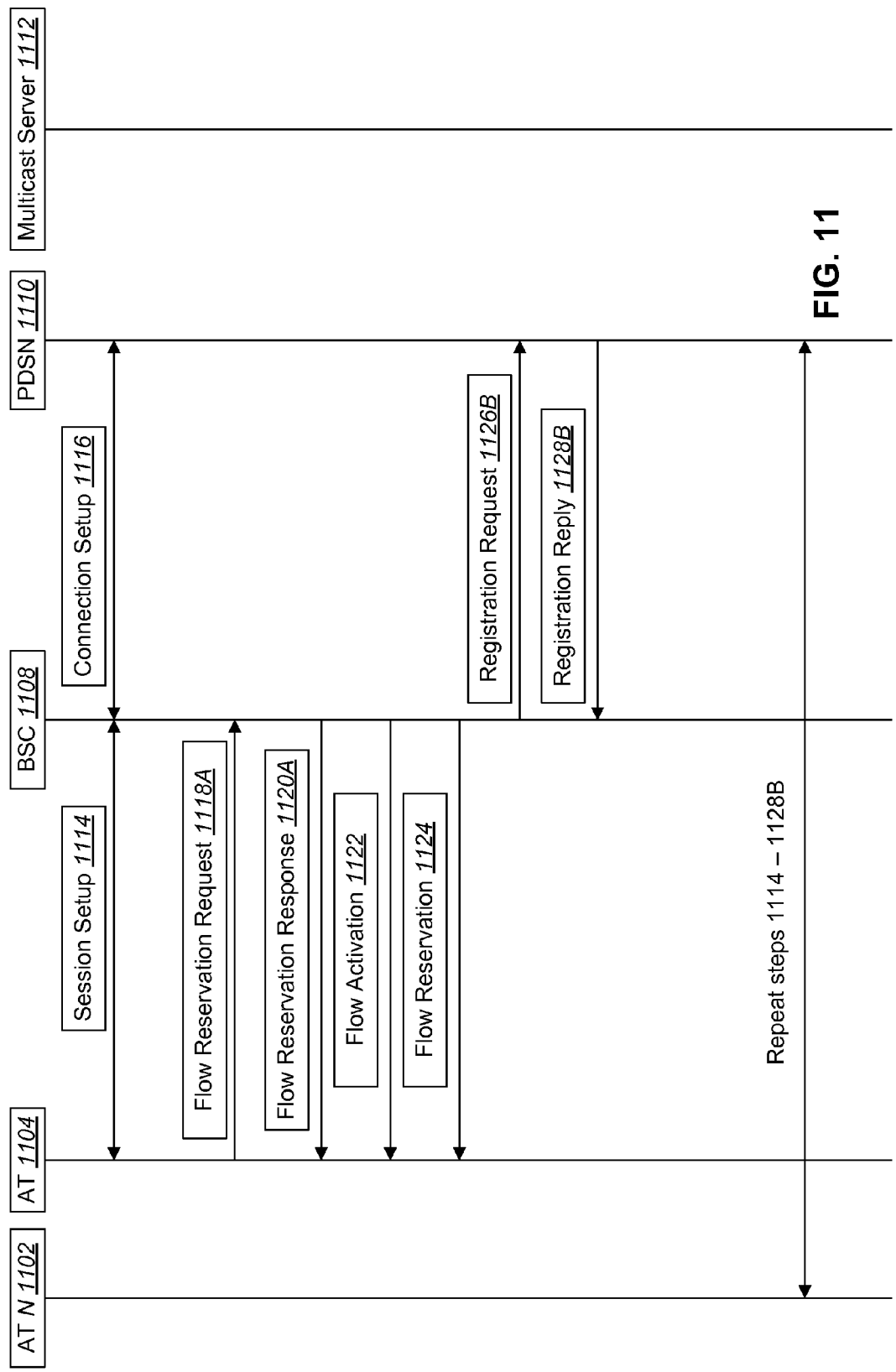
FIG. 11 is a thread diagram illustrating one embodiment of a data path being established for supporting multiple transient multicast group connections for an access terminal.

FIG. 11 is a thread diagram illustrating one embodiment of a dedicated data path being established by an access terminal 1104, for supporting multiple transient multicast group connections. The data packets may be transmitted by the PDSN 1110 over this established data path connection. An access terminal 1104 may first establish a session 1114 with a base station controller 1108. The base station controller 1108 may establish an A11 connection 1116 with a PDSN 1110.

In one embodiment, the multicast server 1112 is a PTT server. In another embodiment, the multicast server 1112 is a PoC. Each access terminal within a network, such as a single access terminal 1104 and a plurality of access terminals 1102, may establish a RLP flow and an auxiliary A10 channel. As previously mentioned, the auxiliary A10 channel may be dedicated for certain data traffic. The RLP flow may be bound to the auxiliary A10 channel at a base station controller 1108. This data path may be completely established when the multicast group connection with the multicast server 1112 is established.

The single access terminal 1104 may send a flow reservation request 1118A to the base station controller 1108. The flow reservation request 1118A may include identification for the IP flow and QoS parameters for which the RLP flow reservation is requested. The flow reservation request 1118A may also include an indication that the flow reservation is for a transient multicast group IP flow. In the embodiment illustrated here, an access terminal may establish reservations for more than one transient multicast group. The base station controller 1108 may reserve RLP flows for transient multicast groups in such a way that would maximize the likelihood of finding the same RLP flow available for assignment in all access terminals belonging to a transient multicast group when the connection is established for that group. The base station controller 1108 may respond by transmitting a flow reservation response 1120A that may include the QoS parameters granted for the IP flow. The base station controller 1108 may send flow activation 1122 to activate the RLP flow. The base station controller 1108 may send the flow reservation 1124 to assign the activated RLP flow for the IP flow indicated in flow reservation request 1118A.

In one embodiment, the base station controller 1108 transmits an A11 registration request 1126B to the PDSN 1110. The A11 registration request 1126B may include the IP flow identification and the granted QoS parameters of the IP flow for which the auxiliary A10 channel is to be established. The PDSN 1110 may respond by transmitting a registration reply 1128B indicating the successful establishment of the auxiliary A10 channel.

The steps 1118A-1128B may be repeated by the access terminal 1104 for another transient multicast group IP flow. The access terminal 1104 may therefore establish resources at the base station controller 1108 and PDSN 1110 for multiple transient multicast group connections at the same time. The steps 1114-1128B described in FIG. 11 may be repeated for each access terminal 1102 included in a network.

Figure 12:
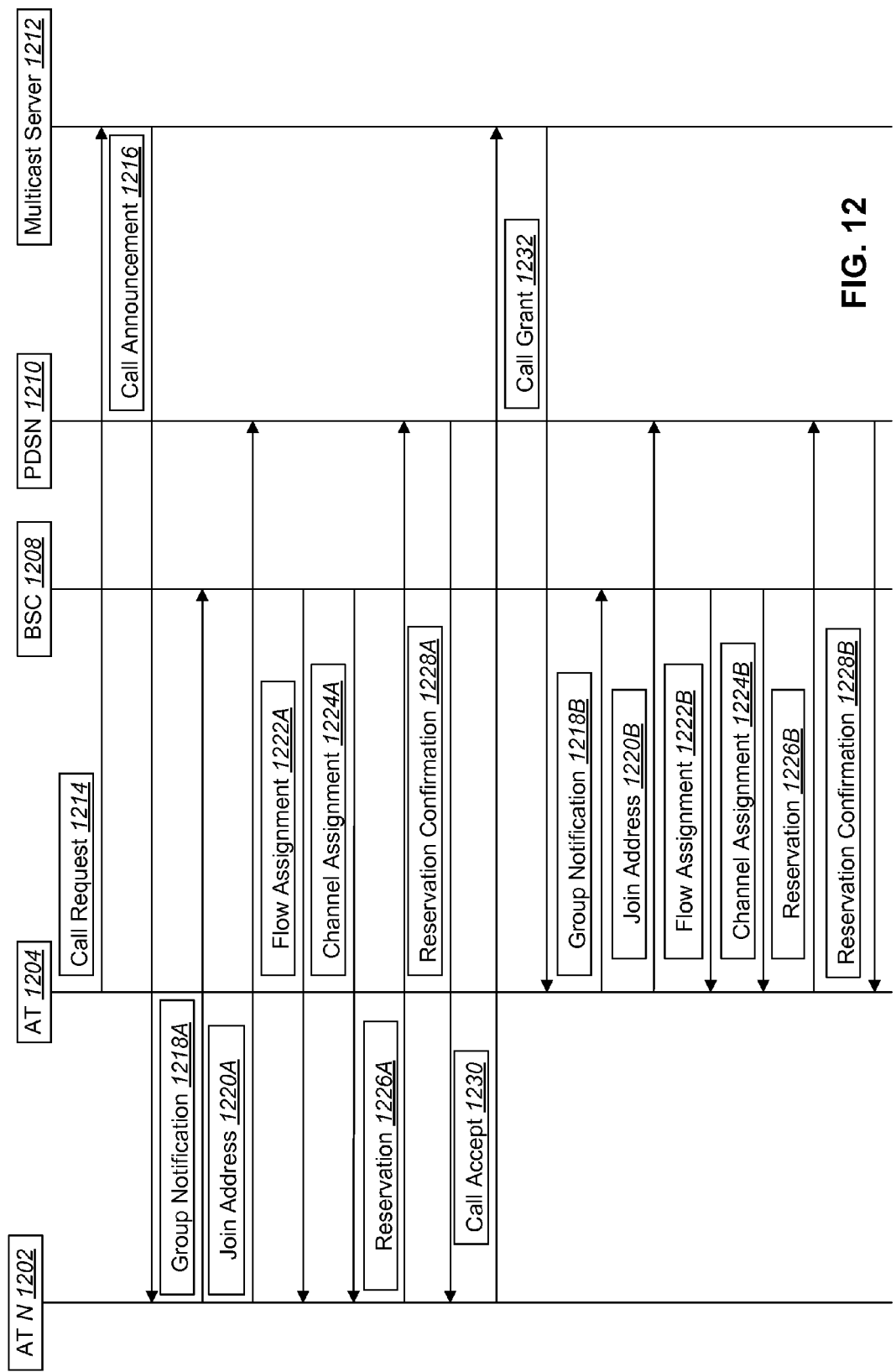
FIG. 12 is a thread diagram illustrating one embodiment of a transient multicast group connection being established between one or more access terminals and a multicast server utilizing a multicast IP address.

FIG. 12 is a thread diagram illustrating one embodiment of a transient multicast group connection being established between one or more access terminals 1202, 1204 and a multicast server 1212. This diagram illustrates the multicast group connection setup procedure when access terminal can support multiple transient multicast group connections at the same time. A first access terminal 1204 may multicast information to a second, third, etc. up to an access terminal 1202 (AT N). In one embodiment, the access terminal 1204, sends a call request 1214 to the multicast server 1212. The multicast server may send a call announcement 1216 to one or more access terminals, represented by AT N 1202. The call announcement 1216 may include parameters such as a call identification, multicast IP address and multicast port. The multicast server 1212 may use the multicast IP address and port indicated in 1216 to transmit data to each access terminal 1202, 1204 in the group.

The access terminals within the plurality of access terminals 1202 may use the parameters included in the call announcement 1216 to send a group notification 1218A to a base station controller 1208. The group notification 1218A may include the multicast IP address for identifying the multicast group. Each access terminal 1202 may send a join address 1220A notification to a PDSN 1210. In other words, each access terminal 1202 in the group joins a multicast IP address group rooted at the PDSN 1210. The joining of the access terminals 1202 to the multicast IP address group may be implemented using IGMP protocol.

The base station controller 1208 may become aware of each access terminal that belongs to the same multicast group via the multicast group notified by the access terminal in group notification 1218A to the base station controller. In one embodiment, the base station controller 1208 elects one of the RLP flows that have been established for the multicast group to serve as the "leader" RLP flow. As explained earlier, the base station controller 1208 receives packets from the PDSN 1210 over the dedicated auxiliary A10 channel for each of the access terminals in the multicast group connection and forwards the packet to the RLP flow assigned to it. The "leader" RLP flow may forward the packet to the base station transceiver for over the air transmission using the multicast MAC ID. The non-leader RLP flows discard and drop their respective packets. If the access terminal with the "leader" RLP flow leaves the multicast group connection or geographically moves away from the service area of the serving base station controller, another access terminal's RLP flow may be selected as the new "leader" RLP flow.

The base station controller 1208 sends a flow assignment 1222A to the access terminals 1202 indicating the RLP flow that has been assigned to the multicast group notified in 1218A. The base station controller 1208 may employ various algorithms in order to assign the same RLP flow number to all the access terminals in the multicast group connection. In one embodiment, the base station controller may use a hash algorithm on the multicast group IP address to determine the RLP flow to be assigned. In another embodiment, the base station controller may assign a RLP flow that has not been assigned for any of the access terminals that it is serving. The base station controller 1208 sends a channel assignment 1224A to each access terminal 1202. The channel assignment 1224A indicates the channel on which communication may be implemented between each access terminal 1202 and the base station transceiver. The channel assignment 1224A may include a multicast MAC ID that is assigned for transmitting multicast data.

Each access terminal 1202 may transmit a reservation 1226A to the PDSN 1210. The reservation 1226A may include a packet filter and IP flow identification. The IP flow identification in 1226A identifies the IP flow for which the RLP flow assigned in 1222A was reserved previously. The PDSN 1210 may transmit a reservation confirmation 1228A. In one embodiment, the packet filter may be set up at the PDSN 1210 such that the data traffic for the transient multicast group is filtered in to the dedicated auxiliary A10 channel established previously Each access terminal 1202 after receiving the reservation confirmation 1228A sends the call accept 1230 notification to the multicast server 1212.

The multicast server 1212 may send a call grant 1232 to the access terminal 1204 that originated the multicast group connection. The call grant 1232 indicates a successful setup of multicast group connection and may include parameters such as the call identification, multicast IP address and multicast port. The access terminal 1204 may send a group notification 1218B to the base station controller 1208 indicating the multicast IP address assigned for the multicast group. The access terminal 1204 may also send a join address 1220B notification to the PDSN 1210. In other words, the access terminal 1204 may join the multicast IP address group rooted at the PDSN 1210. The access terminal 1204 may join the multicast IP address group via the IGMP protocol. The base station controller 1208 sends a flow assignment 1222B to the access terminal 1204 indicating the RLP flow that has been assigned to the multicast group notified in 1218B. The base station sends a channel assignment 1224B to the access terminal 1204. The channel assignment 1224B indicates the channel on which communication may be implemented between each access terminal 1204 and the base station transceiver. The channel assignment 1224B may include a multicast MAC ID that is assigned for transmitting multicast data.

The access terminal 1204 may transmit a reservation 1226B to the PDSN 1210. The reservation 1226B may include a packet filter and IP flow identification. The IP flow identification in 1226B identifies the IP flow for which the RLP flow assigned in 1222B was reserved previously. The PDSN 1210 may transmit a reservation confirmation 1228B. In one embodiment, the packet filter may be set up at the PDSN 1210 such that the data traffic for the transient multicast group is filtered into the dedicated auxiliary A10 channel established previously.

Figure 13:
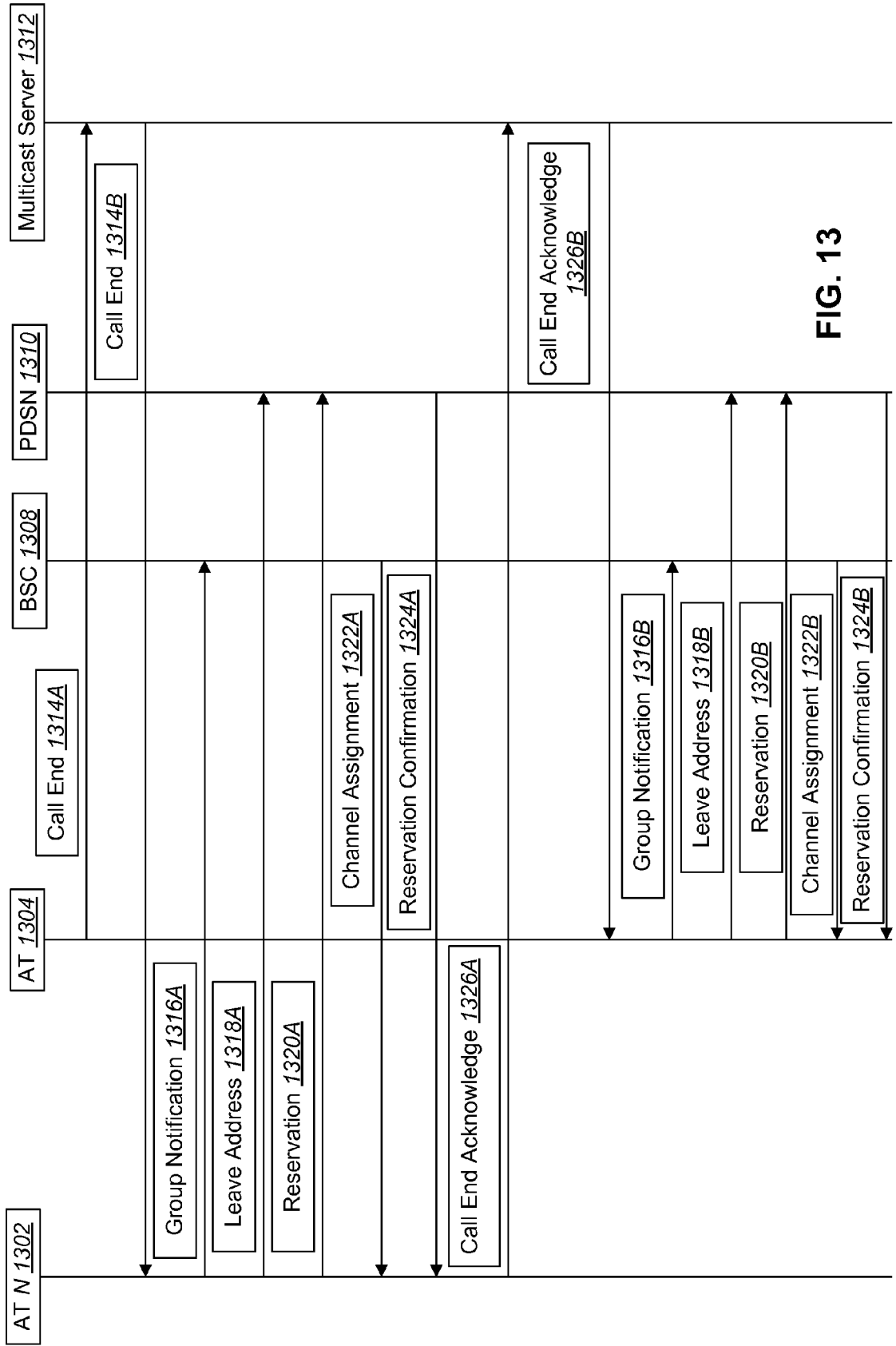
FIG. 13 is a thread diagram illustrating one embodiment of a transient multicast group connection being terminated between a multicast server and one or more access terminals.

FIG. 13 is a thread diagram illustrating one embodiment of a transient multicast group connection being terminated between a multicast server 1312 and one or more access terminals 1302, 1304. The thread diagram illustrated in FIG. 13 illustrates the case when the access terminals 1302, 1304 can only support multiple transient multicast group connections at any given time. A single access terminal 1304 may send a call end 1314A notification to the multicast server 1312. The multicast server 1312 may send a call end 1314B notification to a plurality of access terminals 1302. The plurality of access terminals 1302 may transmit a group notification 1316A to a base station controller 1308. The group notification 1316A may include the multicast IP address and indicate that the access terminal is leaving the multicast group connection. The plurality of access terminals 1302 may also send a leave address 1318A notification to the PDSN 1310. In one embodiment, the leave address 1318A notification indicates that the plurality of access terminals 1302 is leaving the multicast IP address group rooted at the PDSN 1310. In other words, the plurality of access terminals 1302 is no longer associated with the multicast IP address. The leave address 1318A notification may be sent utilizing IGMP protocol.

Each access terminal 1302 may transmit a reservation 1320A to the PDSN 1310. The reservation 1320A may include a packet filter and IP flow identification. The IP flow identification in 1320A identifies the IP flow for which the RLP flow is assigned in the multicast group connection. The base station controller 1308 may send a channel assignment 1322A to the plurality of access terminals 1302. The channel assignment 1322A may indicate that the multicast MAC ID is not associated with the plurality of access terminals 1302. The PDSN 1310 may transmit a reservation confirmation 1324A. In one embodiment, the packet filter may be removed at the PDSN 1310 such that the data traffic for the transient multicast group is no longer filtered into the dedicated auxiliary A10 channel. Each access terminal 1302 after receiving the reservation confirmation 1324A sends the call end acknowledge 1326A notification to the multicast server 1312.

In one embodiment, the multicast server 1312 sends a call end acknowledge 1326B to the single access terminal 1304. The single access terminal 1304 may transmit a group notification 1316B to the base station controller 1308. The group notification 1316B may include the multicast IP address and indicate that the access terminal is leaving the multicast group connection. The single access terminal 1304 may further send a leave address 1318B notification to the PDSN 1310. The leave address notification 1318B may indicate that the single access terminal 1304 is not longer associated with the multicast IP address group. The access terminal 1304 may transmit a reservation 1320B to the PDSN 1310. The reservation 1320B may include a packet filter and IP flow identification. The IP flow identification in 1320B identifies the IP flow for which the RLP flow is assigned in the multicast group connection. The base station controller 1308 may also send a channel assignment 1322B to the single access terminal 1304. The channel assignment 1322B may indicate that the multicast MAC ID is not associated with the access terminal 1304. The PDSN 1310 may transmit a reservation confirmation 1324B. In one embodiment, the packet filter may be removed at the PDSN 1310 such that the data traffic for the transient multicast group is no longer filtered into the dedicated auxiliary A10 channel.

Figure 14:
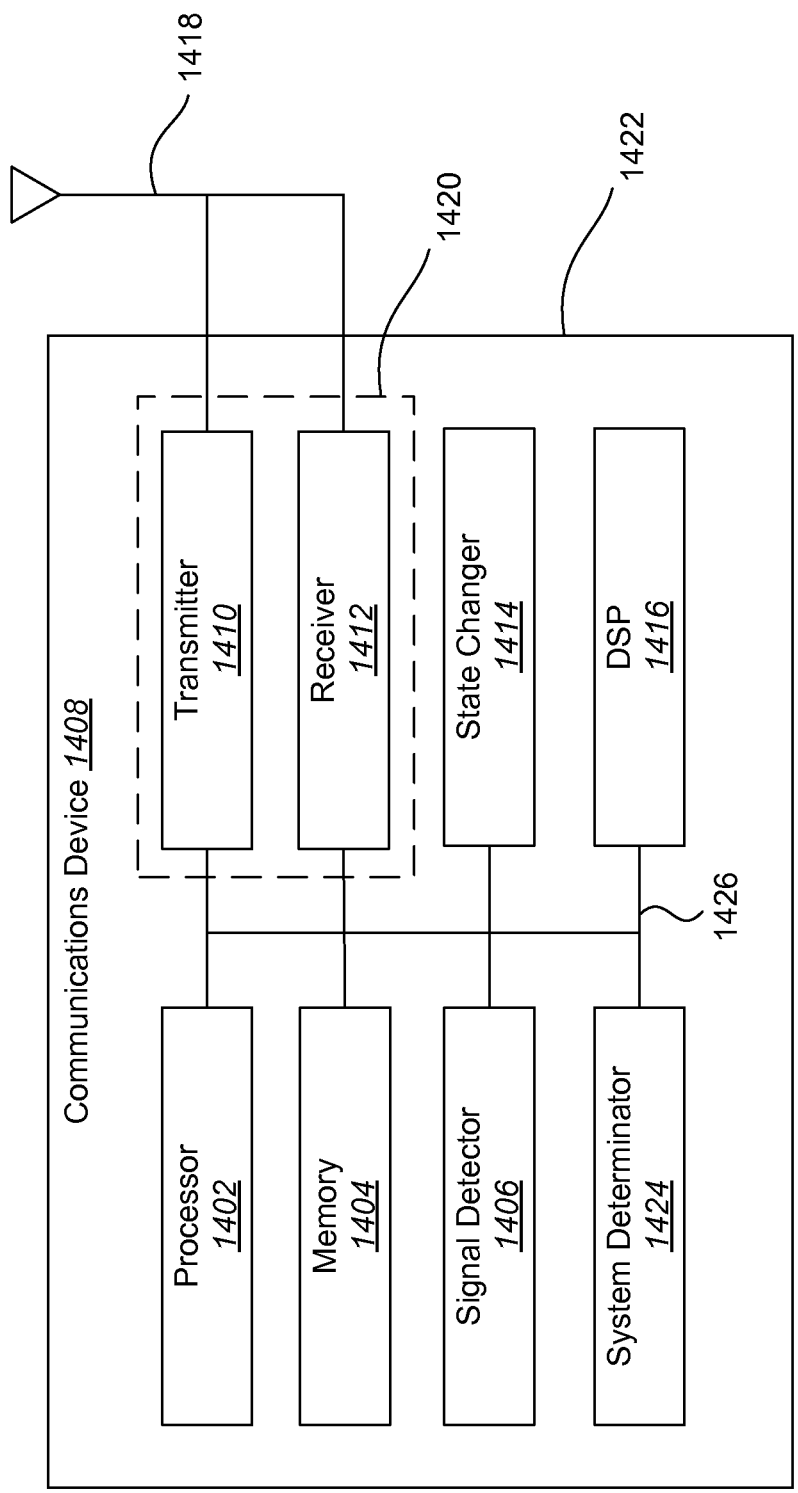
FIG. 14 illustrates various components that may be utilized in a communications device in accordance with a configuration.

FIG. 14 illustrates various components that may be utilized in a communications device 1408, such as an access terminal, in accordance with a configuration. The device 1408 includes a processor 1402 which controls operation of the device 1408. The processor 1402 may also be referred to as a CPU. Memory 1404, which may include both read-only memory (ROM) and random access memory (RAM), provides instructions and data to the processor 1402. A portion of the memory 1404 may also include non-volatile random access memory (NVRAM).

The device 1408 may also include a housing 1422 that includes a transmitter 1410 and a receiver 1412 to allow transmission and reception of data between the access terminal 1408 and a remote location. The transmitter 1410 and receiver 1412 may be combined into a transceiver 1420. An antenna 1418 is attached to the housing 1422 and electrically coupled to the transceiver 1420.

The communications device 1408 also includes a signal detector 1406 used to detect and quantify the level of signals received by the transceiver 1420. The signal detector 1406 detects such signals as total energy, pilot energy per pseudonoise (PN) chips, power spectral density and other signals.

A state changer 1414 of the device 1408 controls the state of the device 1408 based on a current state and additional signals received by the transceiver 1420 and detected by the signal detector 1406. The device 1408 is capable of operating in any one of a number of states.

The device 1408 also includes a system determinator 1424 used to control the device 1408 and determine which service provider system the device 1408 should transfer to when it determines the current service provider system is inadequate.

The various components of the device 1408 are coupled together by a bus system 1426 which may include a power bus, a control signal bus, and a status signal bus in addition to a data bus. However, for the sake of clarity, the various busses are illustrated in FIG. 14 as the bus system 1426. The device 1408 may also include a digital signal processor (DSP) 1416 for use in processing signals.

Figure 15:
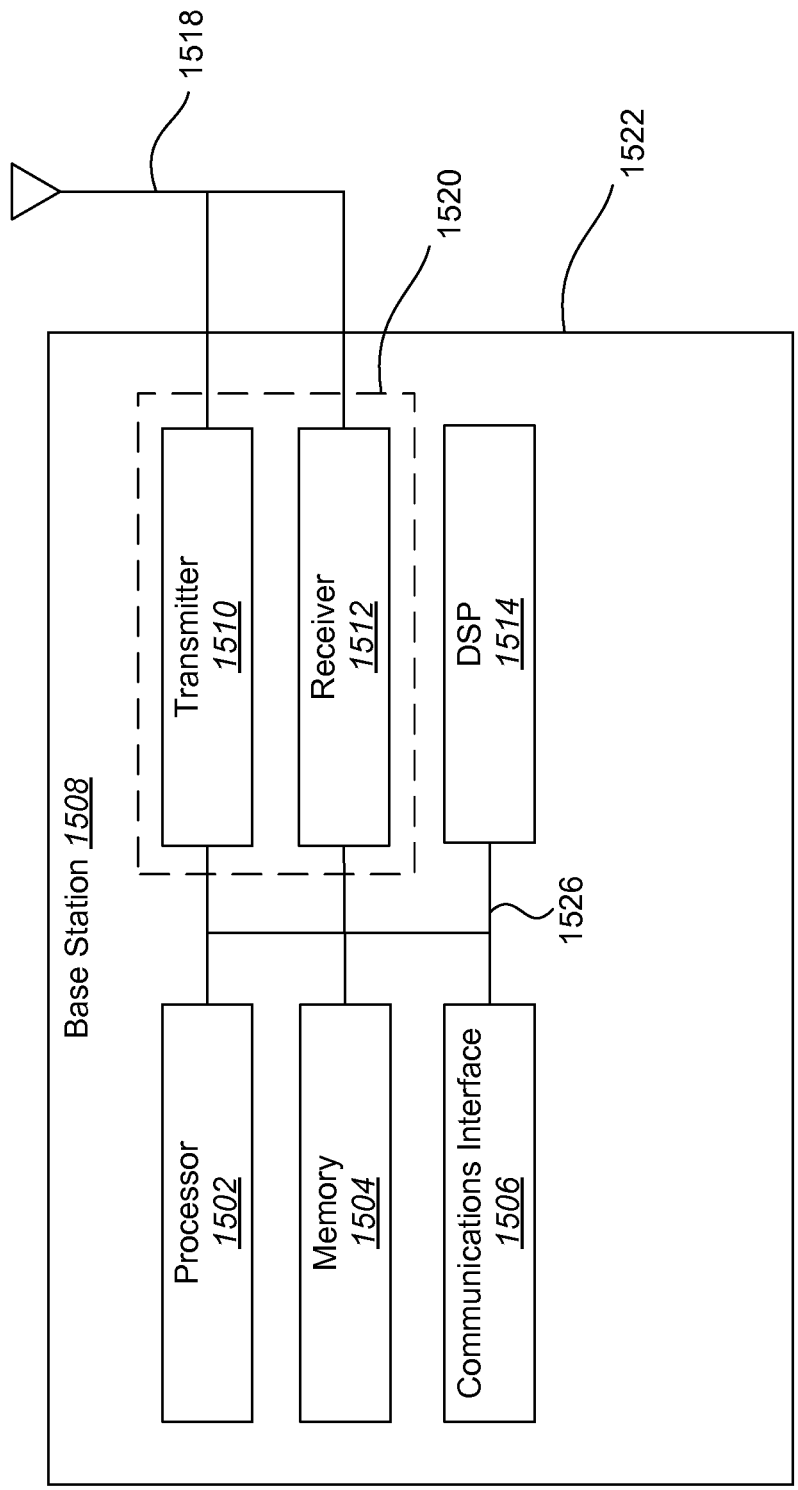
FIG. 15 is a block diagram of a base station in accordance with one embodiment of the disclosed apparatus.

FIG. 15 is a block diagram of a base station 1508 in accordance with one embodiment of the disclosed apparatus. The base station 1508 may be a base station controller, a base station transceiver, etc. The base station 1508 includes a transceiver 1520 that includes a transmitter 1510 and a receiver 1512. The transceiver 1520 may be coupled to an antenna 1518. The base station 1508 further includes a digital signal processor (DSP) 1514, a general purpose processor 1502, a memory 1504, and a communication interface 1506. The various components of the base station 1508 may be included within a housing 1522.

The processor 1502 may control operation of the base station 1508. The processor 1502 may also be referred to as a CPU. The memory 1504, which may include both read-only memory (ROM) and random access memory (RAM), provides instructions and data to the processor 1502. A portion of the memory 1504 may also include non-volatile random access memory (NVRAM).

In accordance with the disclosed apparatus, the antenna 1518 may receive reverse link signals that have been transmitted from a nearby communications device 1408, such as an access terminal. The antenna 1518 couples these received signals to the transceiver 1520 which filters and amplifies the signals. The signals are coupled from the transceiver 1520 to the DSP 1514 and to the general purpose processor 1502 for demodulation, decoding, further filtering, etc.

The various components of the base station 1508 are coupled together by a bus system 1526 which may include a power bus, a control signal bus, and a status signal bus in addition to a data bus. However, for the sake of clarity, the various busses are illustrated in FIG. 15 as the bus system 1526.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present systems and methods.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the these mechanisms for transmission of the software are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

The invention claimed is:

1. A method for improving link efficiency in multicast transmissions, the method comprising:
    receiving a data packet at a multicast server;
    processing the data packet;

transmitting a copy of the data packet from the multicast server to a multicast internet protocol (IP) address associated with one or more access terminals; and multicasting the copy of the data packet to each of the one or more access terminals using a channel dedicated for multicast traffic that is associated with each of the one or more access terminals, wherein a base station controller forwards a single copy of the data packet to a base station transceiver for transmission to the one or more access terminals, and wherein both the forwarded single copy of the data packet and the transmission to the one or more access terminals include a multicast media access control (MAC) identifier.

2. The method of claim 1, wherein the base station controller is configured to maintain a multicast group list.

3. The method of claim 2, wherein the multicast group list indicates the one or more access terminals belonging to a particular group.

4. The method of claim 3, wherein the particular group is a permanent multicast group comprising a reserved identifier.

5. The method of claim 3, wherein the particular group is a transient multicast group comprising an identifier that is established upon a setup of a multicast group connection and deleted upon a termination of the multicast group connection.

6. The method of claim 1, further comprising dynamically allocating the multicast MAC identifier to the one or more access terminals when the one or more access terminals enter into a certain geographical sector of the base station transceiver.

7. The method of claim 1, further comprising dynamically deallocating the multicast MAC identifier from the one or more access terminals when the one or more access terminals exit a certain geographical sector of the base station transceiver.

8. The method of claim 1, further comprising discarding additional copies of the data packet.

9. The method of claim 1, wherein the multicast server is a push to talk (PTT) server.

10. The method of claim 1, wherein the multicast server is a push to talk over cellular (PoC) server.

11. An apparatus that is configured to improve link efficiency in multicast transmissions, the apparatus comprising:
a processor;
memory in electronic communication with the processor;
instructions stored in the memory, the instructions being executable to:
communicate with a packet data servicing node;
receive one or more copies of a data packet from the packet data servicing node, wherein each copy of the data packet is associated with an access terminal;
forward a single copy of the data packet to a base station transceiver for transmission to one or more access terminals, wherein both the forwarded single copy of the data packet and the transmission to the one or more access terminals include a multicast media access control (MAC) identifier; and
discard additional copies of the data packet.

12. The apparatus of claim 11, wherein the processor is configured to maintain a multicast group list, and the instructions are further executable to maintain the multicast group list.

13. The apparatus of claim 12, wherein the multicast group list indicates the one or more access terminals belonging to a particular group.

14. The apparatus of claim 11, wherein the instructions are further executable to dynamically allocate the multicast MAC identifier to the one or more access terminals when the one or more access terminals enter into a certain geographical sector of the base station transceiver.

15. The apparatus of claim 11, wherein the instructions are further executable to dynamically deallocate the multicast MAC identifier from the one or more access terminals when the one or more access terminals exit a certain geographical sector of the base station transceiver.

16. A system that is configured to improve link efficiency in multicast transmissions comprising:
means for receiving a data packet at a multicast server;
means for processing the data packet;
means for transmitting a copy of the data packet from the multicast server to a multicast internet protocol (IP) address associated with one or more access terminals; and
means for multicasting the copy of the data packet to each of the one or more access terminals using a channel dedicated for multicast traffic that is associated with each of the one or more access terminals,
wherein a base station controller forwards a single copy of the data packet to a base station transceiver for transmission to the one or more access terminals, and
wherein both the forwarded single copy of the data packet and the transmission to the one or more access terminals include a multicast media access control (MAC) identifier.

17. A non-transitory computer-readable storage medium configured to store a set of instructions, which, when executed by a base station controller, cause the base station controller to perform operations, the set of instructions comprising:
program code to communicate with a packet data servicing node;
program code to receive one or more copies of a data packet from the packet data servicing node, wherein each copy of the data packet is associated with an access terminal;
program code to forward a single copy of the data packet to a base station transceiver for transmission to one or more access terminals, wherein both the forwarded single copy of the data packet and the transmission to the one or more access terminals include a multicast media access control (MAC) identifier; and
program code to discard additional copies of the data packet.

18. A method of multicasting within a wireless communications system, comprising:
receiving at least one copy of a data packet from a multicast server for transmission to a given multicast group; and
forwarding a single copy of the at least one copy of the data packet to a base station transceiver for transmission to a plurality of access terminals belonging to the given multicast group within a given serving area,
wherein both the forwarded single copy of the data packet and the transmission to the plurality of access terminals include a multicast media access control (MAC) identifier (ID) that is assigned to each of the plurality of access terminals.

19. The method of claim 18, wherein the given serving area corresponds to a sector of the wireless communications system.

20. A method of multicasting within a wireless communications system, comprising:
communicating with a packet data servicing node;
receiving one or more copies of a data packet from the packet data servicing node, wherein each copy of the data packet is associated with an access terminal;

forwarding a single copy of the data packet to a base station transceiver for transmission to one or more access terminals, wherein both the forwarded single copy of the data packet and the transmission to the one or more access terminals include a multicast media access control (MAC) identifier; and discarding additional copies of the data packet.

21. An apparatus, comprising:

means for communicating with a packet data servicing node;

means for receiving one or more copies of a data packet from the packet data servicing node, wherein each copy of the data packet is associated with an access terminal;

means for forwarding a single copy of the data packet to a base station transceiver for transmission to one or more access terminals, wherein both the forwarded single copy of the data packet and the transmission to the one or more access terminals include a multicast media access control (MAC) identifier; and means for discarding additional copies of the data packet.

22. An apparatus that is configured to improve link efficiency in multicast transmissions, the apparatus comprising:

a processor;

memory in electronic communication with the processor;

instructions stored in the memory, the instructions being executable to:

receive at least one copy of a data packet from a multicast server for transmission to a given multicast group; and forward a single copy of the at least one copy of the data packet to a base station transceiver for transmission to a plurality of access terminals belonging to the given multicast group within a given serving area, wherein both the forwarded single copy of the data packet and the transmission to the plurality of access terminals include a multicast media access control (MAC) identifier (ID) that is assigned to each of the plurality of access terminals.

23. An apparatus, comprising:

means for receiving at least one copy of a data packet from a multicast server for transmission to a given multicast group; and means for forwarding a single copy of the at least one copy of the data packet to a base station transceiver for transmission to a plurality of access terminals belonging to the given multicast group within a given serving area, wherein both the forwarded single copy of the data packet and the transmission to the plurality of access terminals include a multicast media access control (MAC) identifier (ID) that is assigned to each of the plurality of access terminals.

24. A non-transitory computer-readable storage medium configured to store a set of instructions, which, when executed by a base station controller, cause the base station controller to perform operations, the set of instructions comprising:

program code to receive at least one copy of a data packet from a multicast server for transmission to a given multicast group; and program code to forward a single copy of the at least one copy of the data packet to a base station transceiver for transmission to a plurality of access terminals belonging to the given multicast group within a given serving area, wherein both the forwarded single copy of the data packet and the transmission to the plurality of access terminals include a multicast media access control (MAC) identifier (ID) that is assigned to each of the plurality of access terminals.

25. The method of claim 18, wherein the wireless communications system corresponds to a cellular communications system.

26. The method of claim 20, wherein the wireless communications system corresponds to a cellular communications system.

27. A multicast server that is configured to improve link efficiency in multicast transmissions, the multicast server comprising:

a processor;

memory in electronic communication with the processor;

instructions stored in the memory, the instructions being executable to:

receive a data packet at the multicast server;

process the data packet;

transmit a copy of the data packet from the multicast server to a multicast internet protocol (IP) address associated with one or more access terminals; and multicast the copy of the data packet to each of the one or more access terminals using a channel dedicated for multicast traffic that is associated with each of the one or more access terminals, wherein a base station controller forwards a single copy of the data packet to a base station transceiver for transmission to the one or more access terminals, and both the forwarded single copy of the data packet and the transmission to the one or more access terminals include a multicast media access control (MAC) identifier.

28. A non-transitory computer-readable storage medium configured to store a set of instructions, which, when executed by a multicast server, causes a base station controller to perform operations, the set of instructions comprising:

program code to receive a data packet at the multicast server;

program code to process the data packet;

program code to transmit a copy of the data packet from the multicast server to a multicast internet protocol (IP) address associated with one or more access terminals; and program code to multicast the copy of the data packet to each of the one or more access terminals using a channel dedicated for multicast traffic that is associated with each of the one or more access terminals, wherein the base station controller forwards a single copy of the data packet to a base station transceiver for transmission to the one or more access terminals, and both the forwarded single copy of the data packet and the transmission to the one or more access terminals include a multicast media access control (MAC) identifier.

* * * * *